United States Patent
von Aswege et al.

(10) Patent No.: US 12,429,026 B2
(45) Date of Patent: Sep. 30, 2025

(54) METHOD FOR CONTROLLING A WIND POWER INSTALLATION

(71) Applicant: Wobben Properties GmbH, Aurich (DE)

(72) Inventors: Enno von Aswege, Großefehn (DE); Ulf Schaper, Staffhorst (DE); Henry Mühlenbrock, Hinte (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/399,070

(22) Filed: Dec. 28, 2023

(65) Prior Publication Data

US 2024/0218854 A1 Jul. 4, 2024

(30) Foreign Application Priority Data

Dec. 29, 2022 (EP) ..................................... 22217229

(51) Int. Cl.
| | |
|---|---|
| *F03D 7/02* | (2006.01) |
| *F03D 1/00* | (2006.01) |
| *F03D 7/04* | (2006.01) |

(52) U.S. Cl.
CPC ............ *F03D 7/0224* (2013.01); *F03D 1/00* (2013.01); *F03D 7/0276* (2013.01); *F03D 7/028* (2013.01);
(Continued)

(58) Field of Classification Search
CPC ...... F03D 7/0224; F03D 7/0276; F03D 7/028; F03D 1/00
See application file for complete search history.

(56) References Cited

U.S. PATENT DOCUMENTS 8,478,448 B2 * 7/2013 Krueger ................ F03D 7/0272
 700/286
11,815,066 B2 * 11/2023 Von Aswege ........... F03D 7/043
(Continued)

FOREIGN PATENT DOCUMENTS

DE 102019105296 A1 9/2020

OTHER PUBLICATIONS

Pederson et al., "Safe Operation and Emergency Shutdown of Wind Turbines," AAlborg University, Master's Thesis, May 31, 2012. (160 pages).

*Primary Examiner* — Michael L Sehn
(74) *Attorney, Agent, or Firm* — Seed Intellectual Property Law Group LLP

(57) ABSTRACT

A method for control of a wind power installation which is connected to an electrical supply network and which has a rotor with rotor blades which are adjustable in terms of their blade angle, is able to be operated at a variable speed and is prepared for generating an installation power from wind, wherein a blade angle control is provided for adjusting the blade angles, a closed-loop speed control is provided for closed-loop control of the speed, a closed-loop power control is provided for limiting the installation power, and the wind power installation is able to be operated at an operating point which can be specified, wherein the operating point is characterized at least by the speed and the installation power comprises operating the wind power installation at a first operating point with a first blade angle, checking for a curtailment request, where a reduction in the speed and/or installation power is requested, and if there is a curtailment request, determining a new operating point as the target operating point depending on the curtailment request, wherein the target operating point is characterized by a target speed and a target installation power, and determining a setpoint blade angle as the target blade angle for the target (Continued)

operating point, wherein in order to change the blade angle to the target blade angle, a feedforward control blade angle, or a feedforward adjustment rate describing an adjustment rate of the blade angle, is specified via a feedforward control blade angle control process, wherein the feedforward control blade angle control process gives the feedforward control blade angle or the feedforward control adjustment rate directly to the blade angle control for implementation.

19 Claims, 6 Drawing Sheets

(52) U.S. Cl.
CPC .......... *F03D 7/042* (2013.01); *F05B 2220/30* (2013.01); *F05B 2270/101* (2013.01); *F05B 2270/1032* (2013.01)

(56) References Cited

U.S. PATENT DOCUMENTS

2010/0283247 A1   11/2010   Krueger
2013/0050400 A1*   2/2013   Stiesdal ................. F03D 80/00
                                                         348/36

* cited by examiner

METHOD FOR CONTROLLING A WIND POWER INSTALLATION

BACKGROUND

Technical Field

Embodiments of the present invention relate to a method for controlling a wind power installation and to a corresponding wind power installation.

Description of the Related Art

Wind power installations are known; they generate electrical power from wind. To do this, an aerodynamic rotor is driven by the wind to rotate at an appropriate rotor speed, thereby rotating the generator of the wind power installation so that it can deliver power. The wind power installation is operated in this case at an operating point which is dependent, in particular, on the wind speed and is characterized by the rotor speed and the power which is output.

Such operating points are mostly and essentially steady-state operating points at which specifically the generator speed and the power which is output are essentially constant. Normally, such operating points are essentially specified by a speed-power characteristic curve. Such a speed-power characteristic curve specifies power values for speed values, namely the rotor speed, that is to say power to be delivered by the wind power installation or the generator.

The closed-loop control principle of such a speed-power characteristic curve operates in such a way that a speed is recorded and the associated power is set according to the speed-power characteristic curve. To illustrate an example, if the wind speed now increases, the speed increases as a result, so that a higher power is set according to the speed-power characteristic curve. The higher set power counteracts the acceleration due to the increase in the wind speed. The power is increased further here in accordance with the speed-power characteristic curve until the speed does not increase further, thereby finding a stable operating point.

In this respect, these operating points represent steady-state and therefore also stable operating points at which the wind power installation can be operated well.

However, if the wind speed increases above a nominal wind speed, the rotor speed reaches the value of its rated speed and the output power reaches the value of its rated power. The speed should then not increase further, nor should the output power. A further increase in the speed can then be counteracted by adjusting the rotor blades in terms of their blade angle and thus as a result their angle of attack. The rotor blades are then gradually turned out of the wind, depending on the level of the wind speed. The blade angle thereof thus increases. This range, where the wind speed is so high that it is necessary to avoid increasing the speed and power by adjusting the rotor blades in order to operate the wind power installation appropriately at rated speed and rated power, is also referred to as full-load range or full-load operation. Even in full-load operation, the wind power installation essentially operates at steady-state and therefore stable operating points. Slight fluctuations in the wind speed can, of course, lead to slight fluctuations in the operating point.

In partial-load operation, that is to say when the wind speed has not yet reached the nominal wind speed, the blade angle is usually constant; it is particularly in the range of from 0 to 10, in particular from about 2 to 7 degrees. The wind power installation is designed here in such a way that the operating points lead to aerodynamically optimal operation in partial-load operation. In particular, at least in one core area, a constant tip-speed ratio is often used as a basis here. This design of the wind power installation is realized by the speed-power characteristic curve in the wind power installation.

However, it can now be considered that an external specification must deviate from these operating points, in particular the aerodynamically optimal operating points, but also the operating points in full-load operation. Such an external specification can be the specification of a new, in particular reduced, speed value for the rotor speed, but also (as an alternative or in addition) the specification of an, in particular reduced, power value for the output power.

In principle, increased values can also be specified both for the speed and the power, but in most cases a wind power installation operates in a way in which both the speed and the power are already as high as possible and/or as high as reasonable and/or optimal. However, if the wind power installation is currently already being operated at a reduced operating point, that is to say at a lower speed and/or a lower power than would be possible and/or useful, the specification of a higher speed and/or a higher power is then also considered in particular.

Such a change in the operating point due to artificial specifications usually represents a fault and can place a load on the installation. Particularly sudden changes can lead to a high, particularly mechanical, load on the wind power installation. Among other things, such a change in the operating point can trigger mechanical vibrations and, in the worst case, can even amplify them. Tower vibrations, in particular, may be relevant here.

Such tower vibrations can be triggered, in particular, by the fact that the shear load by the wind on the aerodynamic rotor of the wind power installation changes due to a change in the operating point, as a result of which a deflection of the tower in the region of the aerodynamic rotor, that is to say at the tower head, is changed. This means that the tower head can swing back, which can result in a load on the tower and thus on the wind power installation as a whole.

Such vibrations can be regularly counteracted by gently changing the operating point accordingly or they can be avoided thereby. However, it is often the case that changed operating specifications should often be implemented as quickly as possible. Such changes in operating specifications are often linked to safety or other stability considerations. For example, a speed reduction may be provided when a bird of an endangered species approaches the wind power installation.

A power reduction may be a requirement of the electrical supply network and therefore may be important for the stability of the electrical supply network. For example, in the event of unexpected load shedding in the electrical supply network, a rapid power reduction may be necessary. An emergency stop of a wind power installation may also be the reason for the specification of a changed operating point.

In all these cases, which are just examples, an only slow change in the operating point is therefore undesirable, perhaps even excluded.

BRIEF SUMMARY

Some embodiments address at least one of the mentioned problems. Some embodiments implement a rapid change in an operating point, that is to say, in particular, a fast speed and/or power reduction, while at the same time loads on the wind power installation, in particular mechanical loads on the tower, are kept to a minimum. The intention is at least to propose an alternative to previously known solutions.

The method thus relates to controlling a wind power installation which is connected to an electrical supply network and which has a rotor with rotor blades which are adjustable in terms of their blade angle, is able to be operated at a variable speed and is prepared for generating an installation power from wind. The rotor can also be referred to as an aerodynamic rotor; it is driven by its rotor blades from the wind. The speed of the rotor, that is to say the rotor speed, is variable. The rotor speed can be modified especially by means of an appropriate operating control, but also depends on the wind. The installation power is the power generated and delivered by the wind power installation. As an alternative, the power which is output by the generator can also be considered. There may be differences between the power which is output by the generator and the power ultimately output by the wind power installation, but this does not matter in the context of the present disclosure.

In order to adjust the blade angles, a blade angle control which controls the adjustment of the blade angles is provided. Among other things, a respective corresponding actuating signal can be given to an actuator for this purpose so that corresponding adjusting motors, which are also referred to as pitch drives, adjust the blade angle of the blade. In principle, the blade angle control can be provided in whole or in part for all rotor blades at the same time, especially in the case that the rotor blades are not adjusted individually; the blade angle control can output three respective equal setpoint values, namely one per adjusting drive of a rotor blade, if the rotor has three rotor blades.

Any embodiments of the blade angle control may also be understood to be carried out identically and individually for each blade. If, for example, a specific blade angle is specified for the blade angle control, this is specified for each blade.

A closed-loop speed control is provided for controlling or limiting the speed. This closed-loop speed control can also process setpoint values and activate corresponding control elements and/or actuators or specify activation values for these.

A closed-loop power control is provided for limiting the installation power. The closed-loop power control converts a power setpoint value to a power output. It usually has a limiting effect since naturally the output power cannot be increased by the power available from the wind. The closed-loop power control can take effect or engage in an inverter which feeds into the electrical supply network, and/or on an active rectifier which controls the generator, in particular the generator current.

Furthermore, the method works in such a way that the wind power installation can be operated at an operating point which can be specified, wherein the operating point is at least characterized by the speed, that is to say the rotor speed, and the installation power, that is to say, in particular, the generator power or output power. In partial-load operation, this may be the operating point resulting from a specified speed-power characteristic curve. In full-load operation, the operating point will be characterized by the rated speed and rated power. Even in full-load operation, the operating point can thus be specified in that speed and/or power can be reduced relative to the rated speed and/or rated power. In exceptional cases, however, it is also possible that the speed and/or power are higher than the rated speed and/or rated power, at least a little and/or temporarily.

One step of the method is the operation of the wind power installation at the first operating point, which can also be synonymously referred to here as the normal operating point, depending on a prevailing wind speed. In partial-load operation, the speed and power of the normal operating point are derived, in particular, from the speed-power characteristic curve. As a precaution, it is pointed out that, instead of a power specification, a torque specification for setting such an operating point, which may depend on the type of wind power installation, is also possible in principle. The specification of the power or the torque is equivalent in that they can be converted into one another at a fixed speed via the equation $P = n \cdot m$, which applies to the steady state. In the equation, P is the power (that is to say active power), n is the speed and m is the torque.

In a further step, a test is carried out for a curtailment request in which a reduction in the speed and/or installation power is requested. Such a curtailment request can be specified externally, for example by a supply network operator, or internally by a calculation rule and/or in a time-dependent manner, in particular depending on a time of day. Examples of curtailment requests are given and explained further below.

In particular, such a curtailment request may consist in specifying a new value for the installation power which specifically is lower than the current value of the installation power. A reduced setpoint value can also be specified for the speed, which specifies a lower speed than the current speed.

If such a curtailment request is present, a new operating point is determined as a target operating point depending on the curtailment request, wherein the target operating point is characterized by a target speed and a target installation power. Typically, the curtailment request will only specify a reduced speed value or a reduced output power. When determining a new operating point as the target operating point, at least the respective other variable is determined. Therefore, if a speed reduction is specified, which results in a new speed value as the target speed, an associated target installation power is determined. If a power curtailment with corresponding power specification were to be specified as the target installation power, an associated target speed is determined for this purpose. This defines this target operating point and then the wind power installation is to approach this target operating point.

The next step is to determine a setpoint blade angle as the target blade angle for the target operating point. This means that such a blade angle is not corrected but is predetermined from the outset. Normally, a blade angle is changed by a closed-loop speed control that changes the blade angle depending on a deviation between the setpoint speed and the actual speed. This is not provided for here but it is supplementary if necessary.

It is therefore proposed here that the target blade angle should not be found by means of a correction process, as if it were the final result of a correction, but rather that it should be specified in a targeted manner from the outset. After receiving the curtailment request, a target speed is thus specified as the new speed and a target installation power is specified as the new system power, and the target blade angle is calculated for this purpose. Starting from the current operating point, in this case specifically the first operating point or normal operating point, a further conclusion about the wind situation is also possible.

It is particularly important to note that, although the current operating point is characterized by the speed and installation power and possibly also by the set blade angle, the current wind speed actually essentially stipulates the current operating point. In particular, this means that if a curtailment request is specified, although the target installation power can be stipulated directly as a target installation power, the associated target speed can vary greatly depending on the prevailing wind situation. Since the drawing of power from the wind is artificially reduced due to the curtailment request, the rotor blades must also be adjusted so a new blade angle must be specified, namely the target blade angle.

Conversely, in the case of a curtailment request that specifies a reduced speed, a suitable value of the target installation power would first be found and, in addition, a suitable target blade angle would be found. In the case of speed reduction, it would of course be desirable to reduce the power as little as possible, but in most cases it will still be necessary to reduce the installation power and thus the target installation power. The main reason for this may be the maximum generator torque, which will also cause the power to decrease at a low speed. However, aerodynamic reasons can also play a part or be relevant because—to put it simply—the optimum aerodynamic power can no longer be drawn from the wind at a greatly reduced speed.

It is further proposed that, in order to change the blade angle to the target blade angle, a feedforward control blade angle, or a feedforward control adjustment rate describing an adjustment rate of the blade angle, is specified via a feedforward control blade angle control process, wherein the feedforward control blade angle control process gives the feedforward control blade angle or the feedforward control adjustment rate directly to the blade angle control for implementation.

The blade angle is therefore not corrected, but is specified and set. The specification can be made here via an adjustment rate, that is to say via the specification of the speed at which the blade angle is to be adjusted. The feedforward control blade angle can also be specified as a gradient, either directly or via a corresponding adjustment rate. If only a constant feedforward control blade angle is specified, this may correspond to the target blade angle.

In other words, here a blade angle undergoes feedforward control, that is to say is not or at least not dominantly adjusted by a closed-loop blade control process. The blade angle to be subjected to feedforward control, that is to say the feedforward control blade angle, is basically only given to the blade angle control by means of appropriate actuators for actual implementation.

This ensures that the corresponding blade angle can be controlled as quickly as possible without feedback from a closed-loop control system being able to delay this or trigger oscillations as a result. In particular, such feedback that excites oscillation is thus avoided in any case, regardless of the initial operating point from which it is changed and to which target operating point.

In particular, the feedforward control blade angle corresponds to the target blade angle. However, it is considered that a slightly lower value for the feedforward control blade angle is selected. The target blade angle is then not fully subjected to feedforward control, but only up to 95%, for example. The feedforward control blade angle may be a value of from 80 to 99% of the target blade angle, or a value of from 90 to 99% of the target blade angle. In this case, the basic principle of feedforward control of the blade angle is not abandoned; a different control, possibly also closed-loop control of the target blade angle, can be performed only for the last few percent. This allows for the compensation of small deviations that can occur with pure closed-loop control without feedback. Such deviations may arise, for example, due the wind to change slightly during the adjustment process.

The feedforward control of the feedforward control blade angle, in particular the target blade angle, can be implemented in such a way that this feedforward control blade angle is transferred to the blade angle control directly for implementation or this blade angle control implements the blade angle directly by corresponding actuation of the actuators. There would then be a jump in the blade angle. Since drives for blade angle adjustment, in particular pitch motors, can reach their maximum speed very quickly, such blade angle feedforward control, in which the feedforward control blade angle is directly specified and implemented, could lead to the adjustment drive or pitch motor rotating at this maximum speed until the setpoint blade angle is reached, or until shortly before, for example up to a value in a range of from 90 to 99% of the setpoint blade angle or target blade angle.

As an alternative, in order to change the operation, it is possible to specify the adjustment rate, which accordingly forms a adjustment rate to be set or a part thereof, instead of the feedforward control blade angle. The adjustment rate specifies a blade angle adjustment per time and thus a speed in the physical sense, namely, in particular, for the period of time required to reach the target blade angle. Such an adjustment rate can also clearly be understood as a temporal ramp. The adjustment rate then ranges from the starting blade angle of the normal operating point to the target blade angle of the target operating point.

The method described herein therefore works, in particular, in such a way that a new target operating point is determined according to a curtailment request, for which the target speed, the target installation power and the target operating point are determined, especially as a step before the actual change in the operating point is initiated. In order to carry out the change, in particular, a feedforward control blade angle is also predetermined, but this can correspond to the target blade angle, and this is subjected to feedforward control. The feedforward control blade angle, that is to say in particular the target blade angle, is then implemented directly by the blade angle control without closed-loop control, that is to say without feedback.

Otherwise, if the change from the normal operating point to the target operating point is not carried out, the blade angle control or the blade angle adjustment process works in such a way that it is integrated into a closed-loop speed control system, that is to say a speed control loop. Depending on a deviation between the setpoint speed and the actual speed, a change in blade angle is then determined, or a blade angle adjustment rate, by which or according to which the rotor blade is adjusted in terms of its blade angle. This directly changes the speed, which leads to a changed speed control deviation via the feedback relating to the comparison between the setpoint value and the actual value of the speed, and thus the blade angle change or adjustment rate is changed again or continuously in this control loop.

Such an integration of the blade adjustment process into this speed loop is at least temporarily suspended by the blade angle feedforward control during the feedforward control of the blade angle, that is to say when the feedforward control blade angle is implemented. In principle, it is suspended until the target blade angle is reached. However, if there are only slight deviations from the target blade angle and/or if the blade angle feedforward control process only leads to low adjustment activity, the blade angle feedforward control integrated into the speed control loop can become active again, or make a supplementary, in particular additive, contribution.

According to one aspect, it is proposed that the feedforward control process specifies the feedforward control blade angle or the feedforward control adjustment rate independently of a speed deviation as a deviation of a recorded speed from a specified speed, and/or independently of the recorded speed and independently of the recorded installation power and, in addition or as an alternative, the feedforward control process specifies the feedforward control blade angle or the feedforward control adjustment rate independently of the closed-loop speed control and independently of the closed-loop power control process. The feedforward control process and thus the adjustment of the blade angle therefore does not depend, at least not directly, on the speed or the installation power. The adjustment of the blade angle will have an influence on the speed and the installation power, but this influence is not returned in the sense of closed-loop control, because the feedforward control process does not attempt to match the recorded speed or the recorded installation power to a setpoint value. This is exactly what distinguishes the feedforward control, namely that it specifies the blade angle, or the adjustment rate for it, and this is used directly to adjust the blade angle. This prevents feedback that can cause oscillations. However, this does not mean that the speed must be completely disregarded. For example, a wind estimator can be used to determine the wind speed, and the wind speed estimated in this way can be used to determine the blade angle to be subjected to feedforward control. However, the speed is not taken into account here in terms of closed-loop control technology, that is to say not in the sense that a speed deviation or a speed error is taken into account. It is also possible to consider the tip-speed ratio, which is defined as the quotient of the blade tip speed and the wind speed. However, no speed deviation and therefore no closed-loop speed control is taken into account here.

The fact that the feedforward control operates independently of the closed-loop speed control and independently of the closed-loop power control means, in particular, that the feedforward control is neither contained in the speed control loop nor in the power control loop.

In particular, provision is made for the change in the blade angle from the first blade angle to the target blade angle to be specified completely or at least predominantly by the feedforward control process. It is therefore not only the case that the feedforward control blade angle is specified by the feedforward control process, regardless of the speed and power recorded and regardless of the closed-loop speed control and closed-loop power control, but also that no other control or closed-loop control process changes the blade angle at the same time.

However, it is not necessarily excluded that further closed-loop or control also have a minor influence on the blade angle. For example, the last 5% could still be readjusted by a closed-loop control process. In particular, the blade angle is changed by the feedforward control process at least to 80% of the distance from the first blade angle to the target blade angle. In addition or as an alternative, the change in the blade angle is at least 80% carried out by the feedforward control process in the sense that a setpoint blade angle to be set or a setpoint adjustment rate to be set is specified at least 80% by the feedforward control process on average over the travel path from the first blade angle to the target blade angle.

According to one aspect, it is proposed that the target blade angle is an ideal blade angle, which leads to the target speed and target power under steady-state conditions at the target operating point. In this respect, the steady-state conditions particularly apply to a constant wind speed. The wind speed is always subject to at least slight fluctuations, such that the assumption of a constant wind speed is an idealized consideration. This constant, in particular idealized, wind speed can be assumed to be that wind speed that is assigned to the first operating point. The ideal blade angle must therefore also be assigned to a wind speed.

In partial-load operation, the prevailing, that is to say current, wind speed can be derived from the current speed and the installation power currently generated. Such an operating point corresponds to a point on the speed-power characteristic curve and this speed-power characteristic curve is assigned to a wind speed profile so that a wind speed can be read out as the current wind speed for each point on the speed-power characteristic curve. Of course, it is also possible to consider measuring the wind speed. Such a wind speed measurement is also possible, but can lead to inaccuracies depending on the conditions and the measuring device. In addition, in simple terms, an ideal wind speed is also sought to determine the ideal blade angle. This is easy to gather from the current operating point.

If the wind power installation is operating at full load, the wind speed can be inferred from the first blade angle, that is to say the blade angle at the first operating point. The design of the wind power installation can also be used for this purpose. However, it is also possible to consider that empirical values are used, or the wind speed can of course also be measured here.

It is also assumed that this wind speed of the first operating point is also still present when the target operating point is reached. For the target operating point, either a speed or a power is specified by the curtailment request.

If, for example, the speed is specified for the target operating point, the maximum possible power can be sought, which in most cases may be the power at which the rated torque is present as the torque. For this purpose, it is possible to find a blade angle at which this power can be drawn from the wind at the available wind speed and specified speed. This is then the ideal blade angle, or the target blade angle.

It may also be that other influences, such as aerodynamic boundary conditions, influence the maximum power that can be generated, that is to say they further limit the maximum power. In order to take this into account, simulations, in which wind speed, power and speed are varied, can be carried out in advance. This makes it possible to ascertain a corresponding data field, which can be stored. In order to then find a suitable power value with associated blade angles for an available wind speed and a specified speed, corresponding values can be selected in the stored data and interpolation can be carried out between them.

It is very similar in the case where the curtailment request specifies a power reduction. In this case, a suitable speed, which is usually not the maximum speed, is sought. Instead, a speed that ensures the most aerodynamically stable operation possible is sought. Simulations can also be recorded in advance and stored in a data field for this purpose; these simulations can then be accessed to determine the speed and the associated blade angle in order to find a suitable value. Again, interpolation between two values can be carried out.

According to one aspect, it is proposed that the feedforward control process specifies a fixed blade angle or a fixedly specified blade angle time profile as the feedforward control blade angle or that the feedforward control process specifies a fixed adjustment rate as the feedforward adjustment rate. In addition or as an alternative, it is proposed that the feedforward control blade angle or the feedforward control adjustment rate is determined using a model that reproduces the behavior of the wind power installation. In particular, the target blade angle can be specified as a fixed blade angle.

This means a particularly fast adjustment to this target blade angle. However, it is also possible to specify an exact time profile of the blade angle. For example, a continuous profile over time, in particular a linear profile, can be specified in order to move from the first blade angle to the feedforward control blade angle, in particular the target blade angle. However, it is also possible to consider other profiles in which the blade angle is initially adjusted faster and then slower in a predetermined manner, or vice versa.

It is also possible to specify an adjustment rate that ultimately reflects the change in the blade angle per time, so the integrated adjustment rate leads to the feedforward control blade angle, in particular the target blade angle. By specifying the adjustment rate, the actuator, that is to say in particular the pitch motor or pitch drive, can be better controlled.

To implement the feedforward control process, it is proposed, in particular, to use a model that reproduces the behavior of the wind power installation. This means that possible operating points, which are considered for the implementation of the curtailment request, can be modeled taking into account the prevailing wind speed. Building on this, a suitable target operating point can be found based on one or more boundary conditions or, if only a meaningful target operating point is considered for implementation, this can also be found.

If a curtailment request that specifies a reduced speed value is specified, a boundary condition may be to maximize the installation power. Limits that are to be observed here, such as the maximum generator torque and, of course, also the maximum permissible power, may be additional boundary conditions.

In the case of the specification of a reduced power as a curtailment request, a boundary condition may be to find the most aerodynamically stable operating point possible. In this case, particularly operating points that derive an aerodynamic power from the wind that corresponds to the reduced installation power specified by the curtailment request, plus power losses, which are neglected here for the purposes of explanation, are taken into account in the model and compared. This aerodynamic power depends on the rotor speed and the blade angle. Often, a tip-speed ratio can be considered here. In any case, the modeling can be used to find operating points that lead to the desired aerodynamic power which is thus drawn from the wind.

The modeling can also be used to model the blade angle profile and/or the adjustment rate. The model can in this case take into account what conditions the wind power installation adopts on the way from the first operating point to the target operating point. The feedforward control blade angle or the adjustment rate can be specified accordingly. For example, this modeling can prevent a flow stall, which could otherwise lead to the wind power installation coming to a stop.

In particular, it is proposed that the feedforward control blade angle and thus, in particular, the target blade angle or an adjustment rate therefor is determined by a model and does not result from a control loop in which the blade angle is adjusted until the otherwise desired operating point is reached.

According to one aspect, it is proposed that a target tip-speed ratio is provided for the target operating point as the tip-speed ratio characterizing the target operating point, and the target blade angle is determined in such a way that the target tip-speed ratio is set at the target operating point under steady-state conditions. The tip-speed ratio can be used to characterize an aerodynamic behavior of the rotor at the respective operating point, in this case the target operating point. The tip-speed ratio, in this case the target tip-speed ratio, can result when modeling the target operating point. It is also considered that the tip-speed ratio is specified from empirical values for the prevailing wind speed and the given curtailment request. The target blade angle is then determined in such a way that this target tip-speed ratio is set at the target operating point.

According to one aspect, it is proposed that curtailment request is a speed request, as a request for a speed reduction, in particular for the protection of an approaching animal, in particular a bird or a bat, wherein the speed request specifics in particular the level of a specific target speed. In particular, it is considered that an approaching animal, in particular a bird or a bat, is recorded and, depending on the flight direction and flight speed of the animal, the speed of the wind power installation is reduced to such an extent that the animal is not hit or injured by a rotor blade. Such a speed is then specified as a curtailment request. For example, a value of one revolution per minute (1 rpm) can be specified, to give a simple example. This speed, given as an example, would then be the target speed, the level of which could be specified by this value specifically.

It is also considered that the curtailment request specifies a power request as a request for a reduction of the installation power, in particular for supporting the electrical supply network, wherein the power request specifies in particular a specific target power according to the level. For example, a network operator can demand a power reduction and provide a percentage curtailment value for this purpose. Such a percentage curtailment value can be given to a central park control system, which then specifies from this a specific power value for each wind power installation in the park, for example 1 MW, if the wind power installation has previously generated and fed in more power. In any case, this power value, which represents a specific level of the target power, can be taken into account as a curtailment request in order to determine the target operating point depending thereon.

According to one aspect, it is proposed that, in the case of a power request as the curtailment request, a maximum power is specified for the installation power, the current installation power, if it is greater than the maximum power, is reduced to the maximum power, and, in order to change the speed to the target speed, the blade angle is adjusted to the target blade angle by means of the blade angle feedforward control process, wherein the feedforward control process specifies the blade angle or the adjustment rate as a manipulated variable.

It is therefore proposed that, in order to curtail the power, it is lowered to the specified value as quickly as possible, in particular as quickly as is physically possible. This can be done in such a way that, after receiving the curtailment request, an infeed unit of the wind power installation feeding into the electrical supply network only feeds in the power according to the curtailment request.

This rapid power reduction can in the short term lead to the wind power installation generating too much power from the wind, which cannot be fed in. Such an excess of power can lead to a short-term acceleration of the aerodynamic rotor and/or provision may be made for such excess power to be led from an electrical intermediate circuit of the infeed unit, or otherwise, via resistors in order to convert this excess power into heat. This may also be referred to as path chopping.

In any case, however, the operating point of the wind power installation must be adjusted to the reduced power as quickly as possible. This especially means that the speed is reduced and the blade angles are adjusted in order to turn the rotor blades at least partially out of the wind. To do this, a correspondingly new operating point is determined, namely the target operating point, and thus a target speed and a target blade angle are determined.

For implementation, that is to say to change the speed to the target speed, the blade angle is adjusted to the target blade angle by means of the blade angle feedforward control process. In the simplest case, an adjustment rate of, for example, 5 degrees per second can be specified, with which the blade angle is adjusted toward the target blade angle. Further options are described below.

According to one aspect, it is proposed that, in the case of a speed request as the curtailment request, the target speed is specified, the installation power is set depending on the specified target speed and, in order to change the speed to the target speed, the blade angle is adjusted to the target blade angle by means of the blade angle feedforward control process.

The main difference between the specified speed curtailment and the specified power curtailment is that the target speed is fixedly specified, while the installation power can be used to reduce the speed, in particular for braking. In particular, the installation power may initially still be high in order to reduce the speed quickly. For the purpose of reduction, however, an aerodynamic power, that is to say the power drawn from the wind, can also be specified, in particular negatively, in order to brake as a result, which will be explained below.

In particular, when a speed request is specified as the curtailment request, it is proposed that, in order to brake the rotor, the installation power, or a generator torque, are specified in order to achieve, together with an aerodynamic power that has been subjected to feedforward control, the greatest possible braking of the rotor. In addition to the aerodynamic power, electrical braking can be carried out here if the installation power or the generator torque is already at maximum; the braking effect caused by this can be maintained, otherwise the installation power or the generator torque can continue to be increased as far as possible.

A common feature of both the specified speed curtailment and the specified power curtailment is that the blade angle is adjusted to the target blade angle by means of the blade angle feedforward control process in order to change the speed to the target speed. This blade angle or this adjustment rate for the blade angle are specified as a manipulated variable and passed to the blade angle feedforward control process for implementation. How the blade angle can be determined for this by the feedforward control process is explained below.

According to one aspect, it is proposed that the blade angle feedforward control process specifies the blade angle or the adjustment rate as the manipulated variable. This should preferably be model-based. When specifying the blade angle or the adjustment rate, use is made of a model that simulates the behavior of the wind power installation. This blade angle or this adjustment rate for the blade angle are given as the manipulated variable to the blade angle feedforward control process for implementation. The blade angle feedforward control process then actuates one or more actuators accordingly in order to adjust the respective blade accordingly. In this sense, all rotor blades are adjusted.

As a result, the new operating point, namely the target operating point, can be quickly reached by too much power no longer being generated or by the speed reaching its curtailment value.

In particular, it is provided that the closed-loop speed control specifies a blade angle or an adjustment rate of the blade angle as a manipulated variable depending on a speed deviation, and the closed-loop speed control, at least temporarily, is subordinate to the blade angle feedforward control process, such that the manipulated variable specified by the closed-loop speed control is at least temporarily not transmitted to the blade angle control or only with a weighting of less than 50%.

The closed-loop speed control, which determines a blade angle or an adjustment rate of the blade angle depending on the speed deviation, can therefore also be provided outside of normal operation, that is to say outside of the first operating point, that is to say also for controlling the target operating point. However, provision is made for the closed-loop speed control to be subordinate only to the feedforward control process. In other words, the closed-loop speed control is only used to supplement the control of the target operating point. This can be realized by the fact that the manipulated variable generated by the closed-loop speed control is not applied at times, especially at the predominant time, that is to say at least 60% of the time, and thus the adjustment of the blade angle is carried out in time only on the basis of the feedforward control process. In addition or instead, it is also considered that the subordination of the closed-loop speed control to the feedforward control process is achieved by a weighting. For this purpose, the manipulated variable specified by the closed-loop speed control can be weighted, that is to say multiplied by a value between 0 and 1. With a weighting of 50%, the manipulated variable is thus multiplied by 0.5.

In particular, it is proposed that, of the closed-loop speed control and the blade angle feedforward control process, the one which outputs the larger blade angle to be set or the larger adjustment rate to be set as the manipulated variable is active. The blade angle feedforward control process is designed to adjust the blade angle from the first blade angle to the target blade angle as quickly as possible. The feedforward control process thus specifies a very large manipulated variable, which is usually larger than the manipulated variable that determines the closed-loop speed control.

Especially toward the end, if the manipulated variable specified by the feedforward control process is smaller than the manipulated variable specified by the closed-loop speed control, it is possible to switch to the closed-loop speed control. This is especially considered when the blade angle has almost reached the target blade angle and it may then turn out that the target blade angle predetermined by the model does not exactly lead to the desired operation of the wind power installation at the target operating point.

If more power is drawn from the wind at the target operating point reached, that is to say at the target blade angle reached, than is generated from electrical installation power, the aerodynamic power is therefore greater than assumed and this leads to the acceleration of the rotor. This is counteracted by the closed-loop speed control and it is therefore proposed that it takes over the blade adjustment toward the end.

If the blade angle feedforward control process and the closed-loop speed control operate in parallel, their two manipulated variables can be compared with one another. If the manipulated variable of the closed-loop speed control is greater, there is a switch over to the closed-loop speed control. It has been recognized, in particular, that the target operating point should be reached as quickly as possible and this usually happens with large manipulated variables. Thus, if the manipulated variable of the closed-loop speed control is larger than that of the feedforward control process, the closed-loop speed control can supersede the feedforward control process and find the ideal operating point, which can deviate from the precalculated target operating point.

According to one aspect, a time profile of the speed can be specified, so that a time profile of a setpoint speed is specified. This can also be model-based.

The blade angle feedforward control process or a predetermined profile of the feedforward control blade angle is matched to the fact that the blade angle is changed taking into account the reduced installation power in such a way that this profile of the setpoint speed is achieved. Therefore, only a small deviation between the setpoint speed and the actual speed can be expected. This means that even a closed-loop speed control that aims to correct this small deviation will only result in a small manipulated variable.

Larger deviations can only occur toward the end of the adjustment, that is to say near the target operating point and thus near the target blade angle. This may be due to the fact that the manipulated variable of the feedforward control process becomes zero when the predetermined target blade angle is reached. However, if there are still slight deviations from the predetermined profile, the closed-loop speed control will specify a manipulated variable that is not zero and is therefore greater than the manipulated variable of the blade angle feedforward control process. The closed-loop speed control can then be activated by applying it to the process.

The speed profile can also be specified indirectly by specifying a change in speed over time, that is to say a speed change rate. Depending on this speed change rate, a setpoint speed value can be calculated at any time by multiplying it by the elapsed time.

According to one aspect, it is proposed that an aerodynamic braking variable is specified in order to change the speed, wherein the aerodynamic braking variable is provided as a rotor acceleration or an aerodynamic power. In addition or as an alternative, it may be a negative acceleration or a braking or a delay. The braking variable can be designed as a signal profile, so it does not have to be a fixed value.

The aerodynamic power is a power that the rotor generates from the wind, that is to say draws from the wind. This aerodynamic power depends on the wind speed, the rotor speed and the blade angle.

Provision is also made for the feedforward control blade angle to be determined depending on the specified braking variable in order to achieve the specified braking variable. If the aerodynamic power is specified as the braking variable, the blade angle is specified in such a way that the aerodynamic power is achieved; therefore, the aerodynamic power is subjected to feedforward control. The blade angle, which is subjected to feedforward control, ensures that the aerodynamic power is drawn from the wind.

The feedforward control of the aerodynamic power can therefore mean that the rotor speed and blade angle are set taking into account the prevailing wind. The rotor speed cannot be adjusted immediately because, on the one hand, it changes slowly and, on the other hand, it is the result of the interaction between the rotor and the wind. However, this interaction can be influenced by the blade angle. Simply put, if the wind speed and rotor speed are present, the blade angle can be adjusted, in particular, to achieve the desired aerodynamic power. This is exactly what is done in feedforward control of the aerodynamic power. The rotor blade angle is set so as to obtain the aerodynamic power that is to be set, that is to say subjected to feedforward control.

The aerodynamic power is subjected to feedforward control in such a way that the blade angle is set via the blade angle feedforward control process in order to achieve the aerodynamic power. The blade angle is thus adjusted by the blade angle feedforward control process and thus not changed by closed-loop control feedback. In this respect, the adjustment of the blade angle for the blade angle feedforward control process also must be planned in advance, in anticipation of the rotor speed to be set, or continuously updated depending on a recorded and/or estimated rotor speed.

In particular, it is proposed that, depending on the speed, wind speed and specified aerodynamic power, or alternatively a rotor acceleration, a blade angle that leads to the specified aerodynamic power is determined.

The speed can thus be recorded and/or estimated, or the expected behavior of the speed can be determined in advance, which can be done by a predictive calculation, simulation or modulation, and based on this recorded/estimated or precalculated rotor speed, that is to say the precalculated rotor speed profile, the blade angle is set accordingly to give the aerodynamic power, or specified rotor acceleration. The blade angle is quasi-tracked to the speed profile in order to always set the aerodynamic power that has been specified.

The blade angle can be determined on a model basis so that the corresponding blade angle is determined, in particular calculated, via a model. Such a model simulates the behavior of the wind power installation, or at least takes it into account.

The fact that this is done by means of the feedforward control process thus avoids any oscillations caused by closed-loop control feedback.

According to one aspect, it is proposed that the specification of the feedforward control blade angle is repeated continuously, or at least in short-term steps of less than one second. The feedforward control blade angle is always matched to the current operating point as a result thereof. In particular, the aerodynamic power is to be set by the blade angle, with the aerodynamic power depending on the tip-speed ratio and thus on the rotor speed. Therefore, the blade angle should be matched as well as possible to the rotor speed. The rotor speed can be recorded, estimated or calculated in advance.

According to one aspect, it is proposed that, in order to specify the feedforward control blade angle, in particular from the aerodynamic braking variable, a power coefficient to be set is determined and the feedforward control blade angle is determined depending on the power coefficient in order to achieve the power coefficient.

This power coefficient, which can also be referred to as the Cp value, indicates the ratio between the power drawn from the wind and the power able to be drawn from the wind. It can be used to control the aerodynamic power, namely the power drawn, when the available power is known, which in turn can be derived substantially from the recorded wind speed. An aerodynamic rotor of a wind power installation usually has a characteristic map indicating a relationship between the tip-speed ratio, blade angle and power coefficient for this rotor. The characteristic map can be generated as a curved surface in a coordinate system with these three variables by entering the corresponding Cp value for each pair of blade angle and tip-speed ratio, so that all these Cp values form the curved surface.

If the power coefficient to be set is determined, that is to say specified, by this, the tip-speed ratio can be calculated when the wind speed and rotor speed are known. With the power coefficient and the tip-speed ratio, the associated blade angle, and thus the blade angle to be set, can then be read as the feedforward control blade angle.

According to one aspect, it is proposed that an ideal braking variable is specified in order to specify the aerodynamic braking variable, and the ideal braking variable is filtered by means of a filter in order to obtain the aerodynamic braking variable, wherein, in order to obtain the aerodynamic braking variable, the filter filters from the specified ideal braking variable at least one natural oscillation frequency of the wind power installation, which is in particular a natural tower frequency, in particular the first natural tower frequency. The filter is designed, in particular, as a band-stop filter and/or a notch filter.

The ideal braking variable may therefore be an ideal aerodynamic power, or an ideal acceleration, specifically a negative acceleration, in order to brake the rotor, in particular as quickly as possible. Using the example of aerodynamic power, this may be a jump in the aerodynamic power from a maximum value, for example rated power of the wind power installation, to a minimum value, for example the negative rated power of the wind power installation. This may also be a jump to a negative value if a rotor acceleration is specified.

However, it has been recognized that such a jump may contain a frequency component with an excitation frequency, particularly for a tower oscillation. Therefore, it is proposed to filter this frequency component out of the ideal braking variable, in order to at least reduce this frequency component. The result after filtering is the (no longer ideal) aerodynamic braking variable, which can then be used to determine the feedforward control blade angle in the manner already described.

In order to filter out the frequency component, or at least reduce it, in particular a band-stop filter or notch filter is used, which is suitable for selectively filtering out a frequency component or a narrow frequency range. As a result, a large part of the specified ideal braking variable can be retained. The reduction of the rotor speed is therefore still possible very quickly, but without the relevant oscillation, that is to say especially without excitation of the tower oscillation.

In particular, it is proposed that the blade angle is determined depending on speed, wind speed and specified aerodynamic power based on a model and/or based on predetermined relationships between these three variables, in order to set the aerodynamic power.

It has been identified here in particular that it is possible to prevent oscillations by preventing closed-loop control feedback. In addition, a particularly fast adjustment of the first operating point toward the target operating point is also possible because the feedforward control process allows the possibilities of adjustment to be fully exploited, especially taking manipulated variable restrictions into account.

Due to the lack of closed-loop control feedback, the respective current operating point, as far as it is determined by the rotor speed and blade angle, is therefore calculated in advance. In particular, it should be considered here that a corresponding profile of this operating point is calculated in advance because the blade angle and rotor speed will change continuously from the first operating point to the target operating point. The precalculation may contain inaccuracies that could at least be partially eliminated by a closed-loop control process. However, such a closed-loop control process is at least largely dispensed with in order to avoid the aforementioned disadvantages of the closed-loop control process. Small inaccuracies are accepted for this. However, it has been recognized that such inaccuracies are more acceptable than the disadvantages mentioned in the closed-loop control process.

This precalculation, in particular precalculation of the relationships between blade angle, speed, wind speed and predetermined aerodynamic power can be predetermined, specifically precalculated. This precalculation may be model-based. Such a model-based precalculation means that a model of the wind power installation is available at the specified variables and thus this expected behavior is modeled or simulated in order to determine the appropriate value for the blade angle to be subjected to feedforward control. Such a predetermination does not have to take place offline and before commissioning, but can also be carried out during operation if the respective conditions are known, specifically the current wind speed and the current curtailment request, that is to say in particular the specified reduced speed.

In addition or as an alternative, it is proposed that the blade angle feedforward control process specifies the blade angle or the blade angle adjustment rate as a manipulated variable in order to perform feedforward control of the aerodynamic power and the closed-loop speed control, at least temporarily, is subordinate to the blade angle feedforward control process. The blade angle feedforward control process and the closed-loop speed control thus both output a blade angle or an adjustment rate, but not both are used at the same time to adjust the rotor blade. Instead, the adjustment is mainly made by the value which is output by the blade angle feedforward control process. However, the closed-loop speed control can take over, particularly toward the end, or a weighted consideration can be taken, as has already been explained above in connection with the specification of a reduced power as a curtailment request.

In particular, it is proposed that, of the closed-loop speed control and the blade angle feedforward control process, the one which outputs the larger manipulated variable, that is to say the larger blade angle to be set or the larger adjustment rate to be set the manipulated variable is active. The effect of this has also been explained above, specifically that the blade angle feedforward control process usually outputs large manipulated variables here because it is designed to move from the first operating point to the target operating point as quickly as possible. As soon as the target operating point has almost been reached or, from the point of view of the feedforward control process, has almost or completely been reached, the manipulated variable generated by the blade angle feedforward control process decreases, specifically ideally to zero. The manipulated variable of the blade angle feedforward control process then falls below the manipulated variable of the closed-loop speed control, such that the closed-loop speed control thus takes over the control of the operating point again especially toward the end, that is to say near the target operating point.

In particular, it is assumed that the change process from the first operating point to the target operating point is so fast that it can be assumed that the wind speed for this process is substantially constant. In fact, the wind speed will of course not remain exactly the same and the small deviations that result can also be compensated for by the closed-loop speed control near the target operating point.

According to one aspect, it is proposed that the closed-loop speed control outputs a setpoint blade angle or a setpoint adjustment rate as the difference between the actual speed and a setpoint speed depending on a speed control deviation. This setpoint blade angle or this setpoint adjustment rate can be transferred to the blade angle control. It is also proposed that the closed-loop speed control is changed or suspended, while the blade angle feedforward control process directly specifies the blade angle to be set or the adjustment rate to be set. This relates particularly to the fact that the closed-loop speed control is not applied, or if necessary changed, during this process. The algorithm underlying the closed-loop speed control can continue to be executed unchanged and an actual speed value can also be fed back because this is already recorded in the overall operational management system of the wind power installation and is available. While the blade angle feedforward control process is active, the closed-loop speed control should not be active.

If the closed-loop speed control is changed, this may mean that it is applied via a weighting, that is to say in particular with a multiplication of a value less than 0.5, and/or that its parameterization is changed. In particular, the parameterization can be changed by reducing a controller gain or increasing a time constant of the closed-loop speed control, so that the closed-loop speed control does not work as hard or as fast as usual. As a result, the closed-loop speed control could still contribute to correct small deviations, but it is prevented from changing the blade angle feedforward control process too much.

According to one aspect, it is proposed that a time profile of a setpoint speed is specified in order to control the target operating point of the closed-loop speed control and/or a time profile of a setpoint power is specified in order to control the target operating point of the closed-loop power control process. This allows the movement from the first operating point to the target operating point to be controlled more precisely by guiding the profile of the speed or the profile of the power along the corresponding profiles.

According to one aspect, it is proposed that, while the blade angle feedforward control process directly specifies the blade angle to be set or the adjustment rate to be set, the closed-loop speed control is modified in terms of its parameterization, in particular in terms of at least one gain factor. In particular, such a gain factor is reduced in order to thereby reduce the dominance of the closed-loop speed control compared to the blade angle feedforward control process. Here it has been recognized, in particular, that when adjusting the first operating point to the target operating point, this adjustment process is in the foreground and should be implemented with the described advantages by the blade angle feedforward control process.

According to one aspect, it is proposed that a change in blade angle from the first blade angle to the target blade angle can be described as a relative blade angle change of from 0% to 100%, where 0% corresponds to the first blade angle and 100% corresponds to the target blade angle. The relative blade angle change can also be referred to synonymously as the relative blade angle range. For example, if the first blade angle is 10° and the target blade angle is 60°, to give one example, 0% corresponds to 10° and 100% to 60°. A change of one degree would then correspond to exactly 2% in this example.

It is also proposed that the adjustment of the blade angle by means of the blade angle feedforward control process from the first blade angle to the target blade angle is interrupted before the target blade angle is reached and/or is taken over by the closed-loop speed control. The blade angle feedforward control process is therefore not fully active, but is superseded by the closed-loop speed control before the target blade angle is reached.

In particular, it is proposed that the blade angle is adjusted by means of the blade angle feedforward control process for at least 5% to 90%, in particular for 0% to 95%, of the blade angle change and/or the closed-loop speed control is changed or deactivated during this. Remaining with the example of the adjustment from 10° to 60°, the adjustment of the blade angle is carried out by means of the blade angle feedforward control process, that is to say at least for 12.5° to 55°, or from 10° to 57.5°. During this time, that is to say within this range specified by the percentage values, the closed-loop speed control may be inactive and/or changed. In this case, too, if it is inactive, this means that its manipulated variable is not applied. If it is changed, its manipulated variable is applied less and/or the parameterization of the closed-loop speed control is changed.

According to one aspect, it is proposed that, in order to control the target operating point, an aerodynamic braking power with which the rotor is to be braked by the wind is determined, and the blade angle is determined by the blade angle feedforward control process in such a way that the rotor outputs the aerodynamic braking power to the wind, wherein, in particular, the aerodynamic braking power is selected in the range of from 10% to 120% of a rated power of the wind power installation, in particular in the range of from 50% to 100% of the rated power. Thus, it is particularly proposed that not only the aerodynamic power is controlled to zero, but even to a negative value, because now power is no longer taken from the wind but even delivered to it. The rotor blades are therefore not only adjusted so far that they no longer draw power from the wind, but their blade angles are adjusted even further so that they even deliver power to the wind. The aerodynamic braking power thus corresponds to a negative aerodynamic power.

The power delivered to the wind here and thus the aerodynamic braking power can be from 10% to 120% of the rated power of the wind power installation. It has been recognized, in particular, that with 10% aerodynamic braking power, a value that can make a noticeable contribution is selected. The braking power is especially provided up to a range of 100% of the rated power because the wind power installation is designed for such values, including the resulting mechanical loads. Since the adjustment to the target operating point should be as short a procedure as possible, it has been recognized that the aerodynamic braking power can even be above the rated power of the wind power installation, in particular up to 120% thereof. Selecting a value of at least 50% is proposed, such that the aerodynamic braking power can have a significant part in the braking of the rotor.

According to one aspect, it is proposed that, in order to determine the target operating point, a wind speed is estimated, specifically based on the speed, the power and the first blade angle, that is to say the blade angle of the first operating point. This is based, in particular, on the idea that the first operating point at which the wind power installation is found, when the curtailment request is specified, is a steady-state operating point, at which the wind power installation is thus in steady-state operation. The values have thus all settled and as a result the wind speed can be deduced from them. The assumption is also based here on the fact that the wind speed will not change or will not change significantly until the target operating point is reached, such that the wind speed of the first operating point can be used to determine the wind speed, which is assumed to be the wind speed on which the target operating point is based. The target operating point and all the calculations described for this purpose, in particular model-based calculations and/or predeterminations or precalculations, can thus be based on such a wind speed.

According to one aspect, it is proposed that the speed and/or the power at the target operating point is greater than zero. Thus, in particular, the method described relates, at least in one preferred embodiment, to the case of the curtailment request not specifying zero for the power nor zero for the rotor speed, but also the wind power installation still being operated at the target operating point, at least with a speed different from zero and a power different from zero.

According to one aspect, it is proposed that a desired reduction time within which the target operating point is to be reached is specified, and the specification of the temporal blade angle is determined depending on the desired reduction time, in particular by using a model or the model, on which the previously described model-based determinations or calculations are based. In particular, the blade angle time profile can be determined by specifying the rotor acceleration, that is to say the rotor braking, depending on the desired reduction time or the rotor acceleration can be determined directly therefrom.

According to one aspect, it is proposed that, after the blade angle adjustment has been completed using the blade angle feedforward control process, the closed-loop speed control controls or limits the speed to a setpoint speed. If a reduced speed is specified by the curtailment request, the closed-loop speed control controls to this as the setpoint speed. If a reduced installation power is specified by the curtailment request, the setpoint speed can be determined depending on this specified reduced power and/or the wind speed can be measured or monitored and, depending on this, the setpoint speed can be determined in the event of a reduced installation power being specified.

According to one aspect, it is proposed that, when there is a curtailment request, there is a check to determine whether the target operating point is at a sufficient distance from the first operating point. For this, it is further proposed that the blade angle is adjusted by means of the blade angle feedforward control process only if the distance of the target operating point is sufficient. A sufficient distance is then present if the distance is above a predeterminable comparison distance.

This achieves a situation in which the proposed blade angle feedforward control process for changing the first operating point to the target operating point is only used if this also promises an advantage or sufficient advantage over the variant of changing the first operating point to the target operating point simply by specifying the changed setpoint values, in particular the changed setpoint speed value of the closed-loop speed control. In particular, the closed-loop speed control is already suitable for making the change from the first operating point to the target operating point by specifying a new setpoint speed value, which specifically can correspond to the speed of the target operating point. However, it has been recognized that, in the case of a considerable adjustment, the use of the blade angle feedforward control process is advantageous and should be applied; in the case of a small adjustment, that is to say if the first operating point and target operating point are close to each other, the use of the blade angle feedforward control process may be unnecessary.

In particular, it is proposed that a difference between the current speed and the target speed is considered as the distance and this distance is considered sufficient if it is greater than a minimum speed difference that can be specified, and/or a difference between the first installation power and the target installation power is considered as the distance and this distance is considered sufficient if it is greater than a minimum power difference that can be specified. In addition or as an alternative, it is proposed that a difference between the first blade angle and the target blade angle is considered as the distance and is considered sufficient if it is greater than a minimum angle difference that can be specified. The minimum angle difference is preferably at least 10°, in particular at least 20°. The minimum power difference that can be specified is in particular at least 20% of the rated power of the wind power installation, in particular at least 30% of the rated power of the wind power installation. The minimum speed difference is preferably at least 20% of the nominal speed and in particular at least 40% of the nominal speed.

According to one aspect, it is proposed that an approach of a flying animal, in particular a bird or a bat, leads to a speed request as a curtailment request and the target speed is determined on the basis of one criterion, a plurality or all of the criteria from the list, that is to say the list of criteria, comprising the following elements:
  a position of the flying animal,
  a species of the flying animal,
  a speed of movement of the flying animal and
  a direction of movement of the flying animal.

It has been recognized here, in particular, that, in order to protect the flying animal to be protected, the fastest possible speed reduction may be necessary. Such a rapid reduction in the rotor speed can be achieved by the rotor blade feedforward control process and, if necessary, by further measures to reduce the rotor speed as described above.

In addition, it has been recognized that not only should it be checked whether such an endangered animal is approaching, but also how it does or is to be expected to do so. The position of the flying animal can be used to identify how close it is to the wind power installation and therefore how urgent it is to reduce the speed, and thus how significantly it needs to be reduced. For this purpose, it is proposed to determine the target speed depending on the position of the flying animal.

The species of the flying animal can be used to determine how and how quickly it is approaching the wind power installation. The species of the flying animal can also be used to determine whether or not a change in its flight trajectory is to be expected. This can also have an influence on whether and how quickly the flying animal is approaching the wind power installation and thus a hazardous area of the wind power installation, such that the specification of the target speed is suggested depending on the species of flying animal. The species of the flying animal can particularly identify whether it is a bat or a bird. In addition, the species of the flying animal can distinguish between different bat species and/or different bird species. The behavior of the flying animal can be determined from its species. A maximum and/or typical flight speed can be derived and from this it can be better calculated how fast it will approach the wind power installation. It is also possible to determine from the species whether a steady or discontinuous flight path is to be expected.

If the speed of movement of the flying animal is also detected, this can also be used to derive how quickly this animal is approaching the wind power installation and accordingly the target speed can be determined. For this purpose, it is proposed to determine the target speed depending on a speed of the flying animal.

A direction of movement of the flying animal may indicate whether this flying animal is continuing to approach the wind power installation and thus a hazardous area of the wind power installation, or whether it can be expected that the flying animal will fly past the wind power installation. It is thus proposed to determine the target speed depending on a direction of movement of the flying animal.

In addition or as an alternative, it is proposed to continue to monitor the behavior of the flying animal and to specify a new target speed depending on the monitored behavior of the flying animal. It has been recognized here, in particular, that when it is detected that a flying animal to be protected is approaching the wind power installation, the speed does not have to be reduced immediately to such a low value at which a danger to the flying animal is excluded. Such a speed, which can be referred to as safety speed, and which may have very low values, such as 10% of the rated speed or less, should be present when the flying animal is in the region of the rotor of the wind power installation. This should ensure that the rotor speed can be lowered to this safety speed before the flying animal reaches the region of the rotor.

The rotor speed can be slightly reduced if a flying animal to be protected approaches the wind power installation but is still far away. The rotor speed should then be reduced to a value that allows the rotor speed to be reduced to the safety speed if the flying animal continues to fly toward the wind power installation. However, if the flying animal does not continue its flight toward the wind power installation, the rotor speed does not need to be further reduced.

Simply put, the closer the flying animal has come to the wind power installation, the lower the rotor speed can be selected. The closer the flying animal has come to the wind power installation, the shorter the time it would take to reach the wind power installation. Accordingly, the time available to reduce the rotor speed to the safety speed is shorter. Accordingly, the target speed selected can be a speed that is so low that it is possible to be lowered to the safety speed in time should this be necessary due to the further behavior of the flying animal.

Different target speeds depending on the further behavior of the flying animal, in particular depending on the distance between the flying animal and the wind power installation, can be specified in stages. For example, in a first stage, when the flying animal is approaching the wind power installation, the target speed can be set to 80% of the rated speed, and in a second stage, when the flying animal continues to approach the wind power installation, it can be set to 50% of the rated speed, to give an example. If the flying animal then still continues to approach the wind power installation, the target speed can be set to another level, for example 30% of the rated speed, or to the safety speed.

According to some embodiments, a wind power installation is also proposed. This wind power installation is connected to an electrical supply network and has a rotor with rotor blades which are adjustable in terms of their blade angle, is able to be operated at a variable speed and is prepared for generating an installation power from wind. Said wind power installation has blade angle control for adjusting the blade angles; it has closed-loop speed control for controlling or limiting the speed.

The wind power installation is able to be operated at a predeterminable operating point, wherein the operating point is characterized at least by the speed and the installation power, preferably also by the blade angle. The wind power installation is prepared to carry out a method according to any one of the aspects described above. In particular, the wind power installation has an installation control system in which such a method is implemented. The installation control system can thus have a process computer in which the method is stored by a program code.

BRIEF DESCRIPTION OF THE SEVERAL VIEWS OF THE DRAWINGS

The invention is now explained in more detail below by way of example with reference to the accompanying figures.

DETAILED DESCRIPTION

Figure 1:
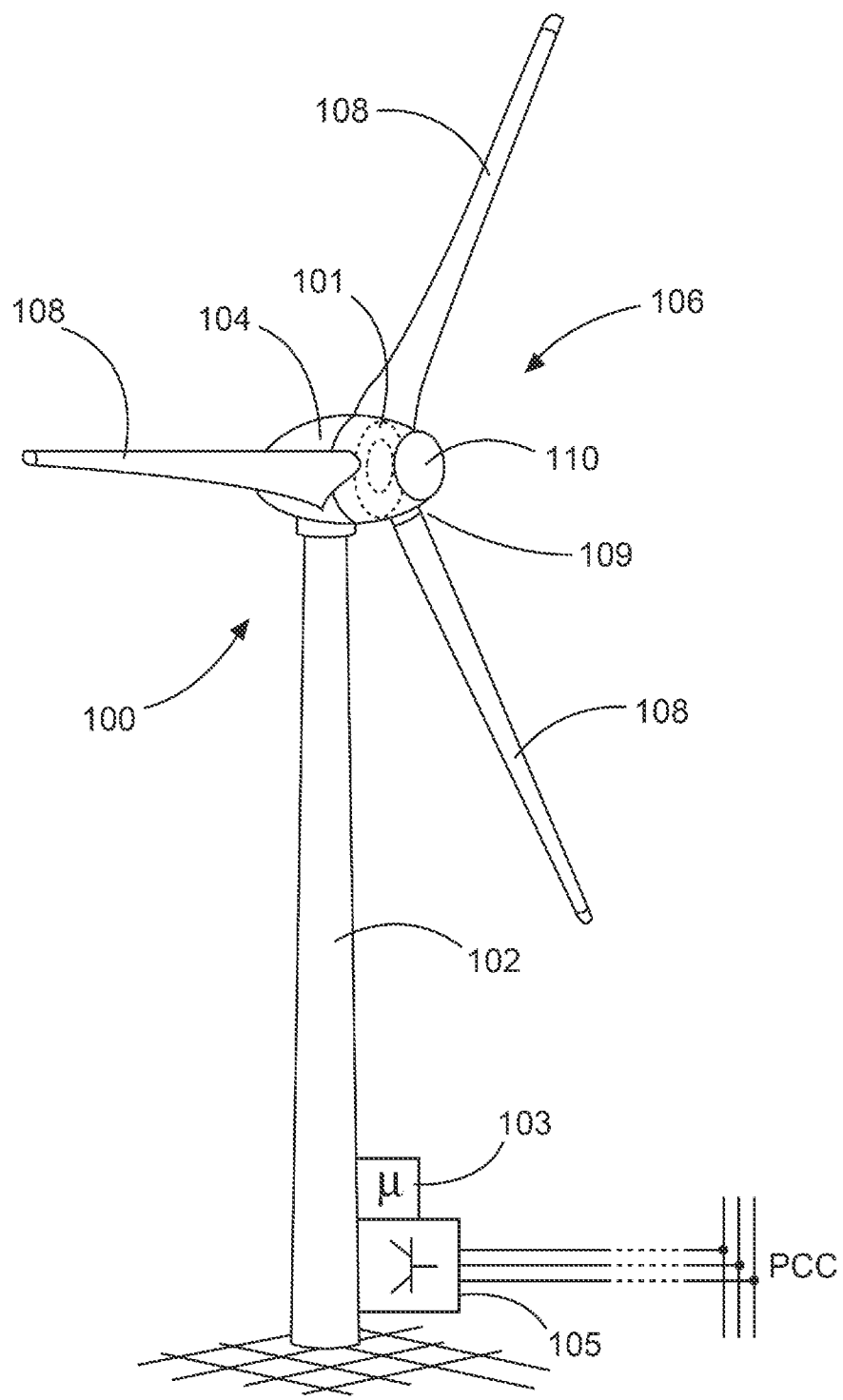
FIG. 1 shows a perspective illustration of a wind power installation.

FIG. 1 shows a wind power installation 100 with a tower 102 and a nacelle 104. A rotor 106 having three rotor blades 108 and having a spinner 110 is disposed on the nacelle 104. During operation, the rotor 106 is set in rotational motion by the wind and in this way drives a generator in the nacelle 104.

The pitch angles, that is to say the blade angles, of the rotor blades 108 may be varied by pitch motors at the rotor blade roots 109 of the respective rotor blades 108.

The wind power installation 100 in this case has an electric generator 101, which is indicated in the nacelle 104. Electric power is able to be generated by way of the generator 101. Provision is made for an infeed unit 105, which may be designed in particular as an inverter, to feed in electric power. It is thus possible to generate a three-phase infeed current and/or a three-phase infeed voltage in terms of amplitude, frequency and phase, for infeed at a grid connection point PCC. This may be performed directly or else together with other wind power installations on a wind farm. Provision is made for an installation control system 103 for the purpose of controlling the wind power installation 100 and also the infeed unit 105. The installation control system 103 may also receive predefined values from an external source, in particular from a central farm computer.

Figure 2:
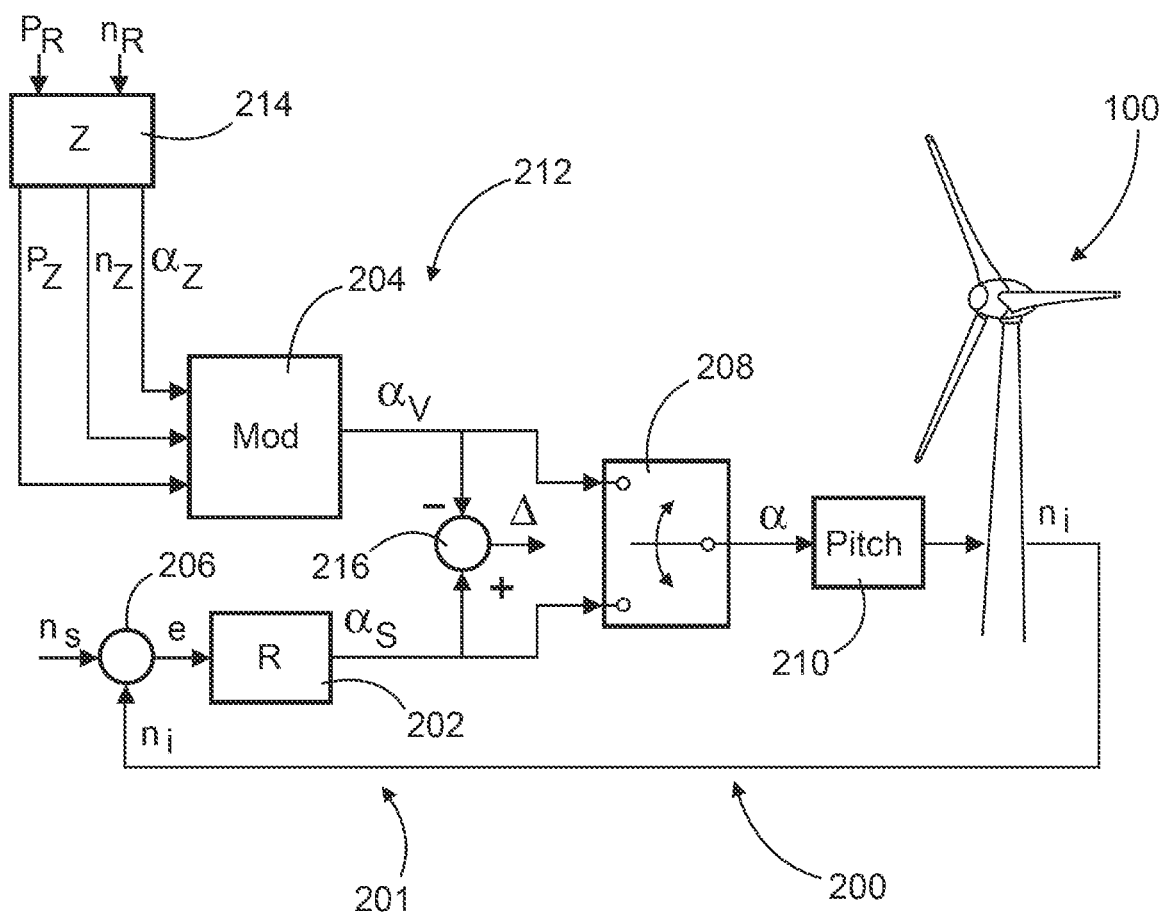
FIG. 2 schematically shows a control structure with a wind power installation indicated.

FIG. 2 shows a control structure 200, which in particular has closed-loop speed control 201 with a controller block 202 and blade angle feedforward control with a modeling block 204. In regular operation, if no change from a first operating point to a target operating point is planned, the closed-loop speed control 201 is active. This works in such a way that a difference between the setpoint speed $n_S$ and actual speed $n_i$ is formed in the first summing point 206. This speed difference thus forms the control error e for the speed and this is passed to the controller block 202. Speed is simplified here and in the entire description and thus also synonymously referred to as the rotor speed.

The controller block 202 converts the control error e to a manipulated variable, namely a blade angle setpoint value $\alpha_S$. This blade angle setpoint value $\alpha_S$ is then passed on unchanged directly via the selection block 208. The significance of the selection block 208 will be described later. In normal operation, if only the closed-loop speed control 201 is active in the structure of FIG. 2, the selection block 208 has no significance and can be viewed in such a way that it simply forwards the blade angle setpoint as from the controller block 202 to the blade angle control 210. The blade angle control 210 is indicated only schematically here and it performs the adjustment of the blade angle, that is to say the blade angle of all of the rotor blades. For this purpose, said blade angle control can in particular control corresponding pitch motors, which is why it is also denoted by "pitch" in the control structure 200 of FIG. 2. The fact that the blade angle control 210 thus acts on the rotor blades is indicated by the fact that its output leads to the schematically illustrated wind power installation 100. The wind power installation 100 may be designed like the wind power installation 100 of FIG. 1.

By controlling the wind power installation 100 and due to the wind, a speed which is recorded as the actual speed $n_i$ and is fed back to the closed-loop speed control 201, namely to the first summing point 206, is set.

In order to change the operation of the wind power installation from a first operating point to a target operating point after receiving a curtailment request, a blade angle feedforward control process 212 is provided. An important element of the blade angle feedforward control process is the modeling block 204. The modeling block 204 receives, in particular from the target specification block 214, the parameters which identify the target operating point to be controlled, namely the target installation power $P_Z$, the target speed $n_Z$ and the target blade angle $\alpha_Z$. The target specification block 214 receives the curtailment request for this purpose. This curtailment request can therefore be a reduced installation power $P_R$ or a reduced rotor speed $n_R$. Both are shown in FIG. 2 as input variables for the target specification block 214, but in fact, usually or exclusively only one of the two variables will be specified in each case.

The modeling block 204 then uses the input variables it has received to determine the blade angle $\alpha_V$ to be subjected to feedforward control. For this purpose, said modeling block can obtain further information that is not shown in the control structure of FIG. 2. This includes the current wind speed, which it can obtain or determine, in particular estimate, from other information. This other information may be information about the first operating point taken as the starting point, namely installation power, rotor speed and blade angle of the first operating point, that is to say the starting operating point.

In addition, the modeling block 204 can obtain a rotor acceleration as an input variable, or can calculate it itself. In addition, it can receive an input variable of an aerodynamic power to be set, or it can calculate it itself.

In any case, the modeling block 204 can include a model of the wind power installation, that is to say a model of the behavior of the wind power installation and, based on this, can predetermine a suitable installation behavior and derive the feedforward control blade angle $\alpha_V$.

One option for implementation in the modeling block 204 is that a table or several tables are stored. Such a table may, for example, have stored suitable feedforward control blade angles or suitable profiles for the feedforward control blade angle for different wind speeds and different target operating points. The first operating point as the starting operating point can be assumed here in particular as one that results at the respective wind speed if the wind power installation is not yet subject to a curtailment request.

In any case, the modeling block 204 outputs the feedforward control blade angle $\alpha_V$, which is to be given to the blade angle control 210 for implementation. The modeling block 204 can in this case in particular continuously output a blade angle, which is only controlled, that is to say is not changed by any feedback, in any case not by speed deviations. In one case, the blade angle feedforward control process 212 can work in such a way that only values of the first operating point, that is to say the starting operating point, are taken into account as recorded values, and further values are predetermined and/or a profile of the feedforward control blade angle is predetermined. The blade angle feedforward control process 212 can also work in such a way that it continuously tracks the feedforward control blade angle based on the current operating point of the system, that is to say continuously recalculates the feedforward control angle at new operating points.

In addition, however, the selection block 208 is provided, which decides whether the target blade angle $\alpha_S$ as the output of the controller block 202 or the feedforward control blade angle $\alpha_V$ as the output of the modeling block 204 is given to the blade angle control process 210 as the blade angle $\alpha$ to be set. The selection block 208 is thus symbolized as a switching block, which can switch between the closed-loop speed control 201 and the blade angle feedforward control process 212. Consideration as a switching criterion is given to which of the two manipulated variables of the target blade angle $\alpha_S$ of the closed-loop speed control 201 and the feedforward control blade angle $\alpha_V$ of the blade angle feedforward control process 212 is greater in magnitude. For the sake of simplicity, the formation of this magnitude is not shown in the structure of FIG. 2.

The second summing point 216 is provided to form this size comparison. The difference in the magnitudes between the target blade angle $\alpha_S$ and the feedforward control blade angle $\alpha_V$ is thus formed at said second summing point 216. Depending on this difference, namely on whether it is positive or negative, the selection block 208 then switches to the target blade angle $\alpha_S$ or to the feedforward control blade angle $\alpha_V$.

Here, it is particularly achieved that the speed continues to run normally, but is inactive as long as the blade angle feedforward control process 212 is dominant, that is to say as long as its feedforward control blade angle $\alpha_V$ is greater than the target blade angle $\alpha_S$. This is the case if the difference which is output by the second summing point 216 is negative. However, if this is no longer the case, the closed-loop speed control can take over again, and this will happen especially when the target operating point is almost reached.

It is pointed out that the specification of a target blade angle $\alpha_S$ or a feedforward control blade angle $\alpha_V$ is clearly illustrated in FIG. 2. As an alternative, an adjustment rate for the blade angle can also be output instead of a blade angle. In this case, the controller block 202 outputs a target adjustment rate for the blade angle instead of the target blade angle $\alpha_S$. The modeling block 204 then likewise outputs a feedforward control adjustment rate for the blade angle instead of the feedforward control blade angle $\alpha_V$. This variant may be preferred because it leads to the speed controller 201 having an integrating behavior, which achieves a steady-state accuracy for the speed to be regulated, without an integrator being required in the controller block 202 for this purpose. Especially with this variant, the closed-loop speed control 201 can continue to run continuously, even if the manipulated variable it generates is temporarily not used.

Figure 3:
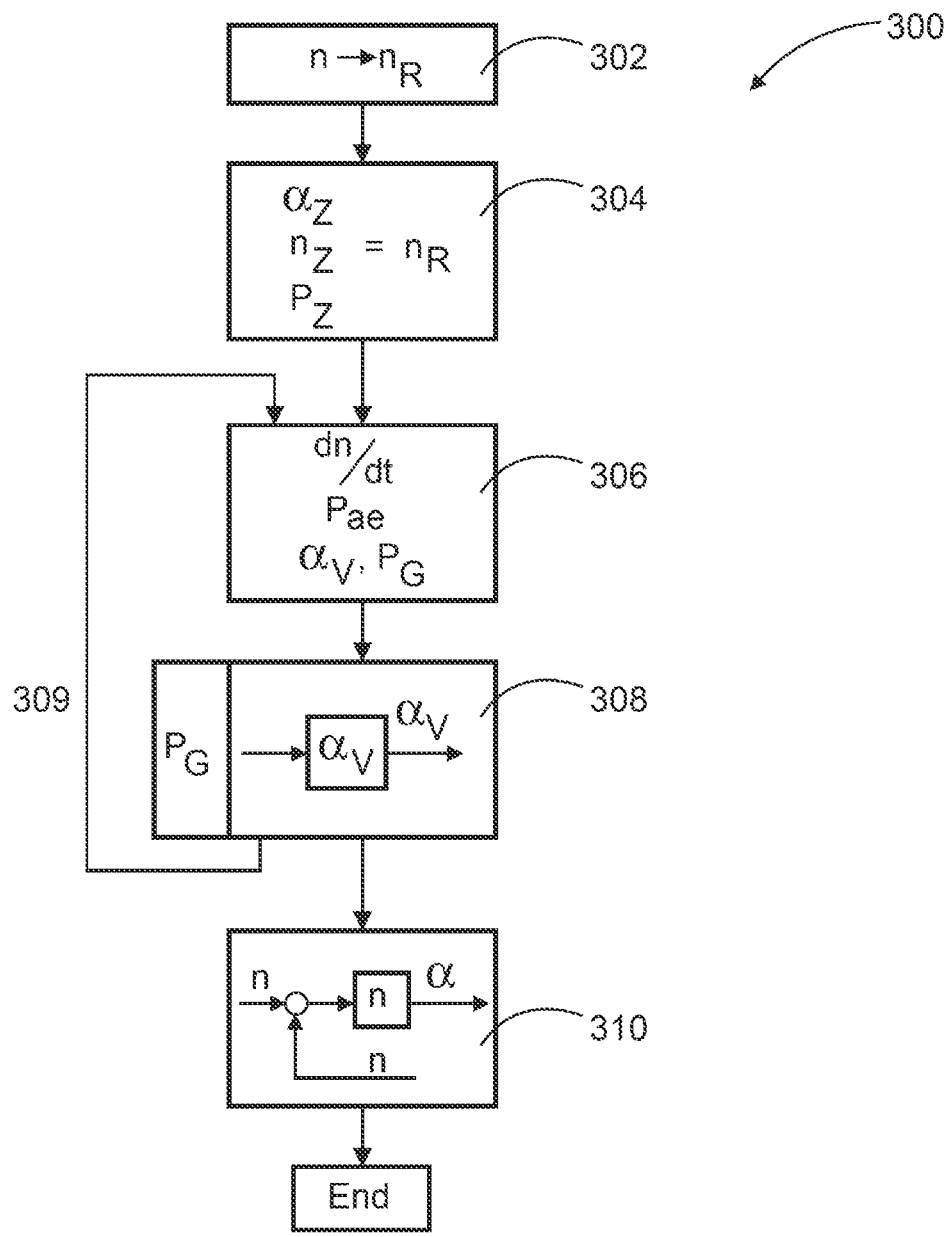
FIG. 3 shows a flowchart when a reduced speed is specified as a curtailment request.

The flowchart 300 of FIG. 3 explains a sequence for the case when a reduced speed, that is to say a speed request, is specified as a curtailment request. In the starting step 302, the reduced speed $n_R$ is then specified for the speed n. This is passed on to the target determination step 304. In the target determination step 304, the target operating point is determined and the values for the target blade angle $\alpha_Z$, the target rotor speed $n_Z$ and the target installation power $P_Z$ are specified. The target rotor speed $n_Z$ then corresponds to the specified reduced speed $n_R$.

The sequence continues with these specified values in the feedforward control determination step 306. In the feedforward control determination step 306, a rotor acceleration, which is symbolized there as dn/dt, is specified or calculated. As an alternative, an aerodynamic power $P_{ae}$ is specified or calculated. The feedforward control blade angle $\alpha_V$ is determined based on this and can be specified as an absolute value or as a profile, or an adjustment rate can be specified instead as a feedforward control adjustment rate. The feedforward control blade angle, its profile or the feedforward control adjustment rate are specified in such a way that the aerodynamic power $P_{ae}$ is achieved. In all of this, an installation power $P_G$ is also taken into account or also determined in the feedforward control determination step 306.

The installation power, or alternatively the generator torque is specified to be as large as possible in order to support aerodynamic braking, as long as the target operating point is not yet reached. The installation power or generator torque affects the rotor speed, thus affecting the change in the operating point and can thus influence the determination of the feedforward control blade angle if it is constantly redetermined depending on the current operating point. However, such a behavior can also be precalculated overall, for example by a simulation. The feedforward control blade angle can then also be adjusted or updated without constantly recording the current operating point.

The feedforward control determination step 306 can be carried out, in particular, in a model-based manner by virtue of said variables being determined based on a model or a simulation, or having been previously determined and stored in a memory for use in the feedforward control determination step 306.

The sequence then continues to the feedforward control step 308. The feedforward control process is carried out in the feedforward control step 308. The feedforward control blade angle, its profile or the feedforward control adjustment rate are passed on to the blade angle control without any control feedback, especially without taking into account a speed deviation, thus only as an open-lop control process. This should be indicated by the symbol in the block for the feedforward control step 308. At the same time, the installation power $P_G$, which is also taken into account or determined in the feedforward control determination step 306, is implemented. For this purpose, said installation power can be passed as a setpoint value to a corresponding frequency converter and/or active rectifier or other activation system of the generator. The installation power $P_G$ is denoted here by the index G to indicate that it acts on the generator and differs from the aerodynamic power $P_{ae}$.

The feedforward control determination step 306 and the feedforward control step 308 can be repeated continuously in order to redetermine or update the feedforward control angle constantly, that is to say continuously or in short-term steps, and then also apply what is indicated by a corresponding repeat loop 309.

While the feedforward control blade angle $\alpha_V$ or its profile or the feedforward control adjustment rate is subjected to feedforward control in the feedforward control step 308, a closed-loop speed control is inactive. Near the target operating point, however, the feedforward control process can transition to the closed-loop speed control, and for this purpose the flowchart 300 changes from the feedforward control step 308 to the closed-loop speed control step 310. In the closed-loop speed control step 310, the closed-loop speed control then takes over the adjustment of the blade angle again and then accordingly there is feedback, namely the feedback of the actual speed. In this case, only small deviations from the target operating point are present and these can best be compensated for by the closed-loop speed control. The target operating point is then reached and the sequence is complete.

Figure 4:
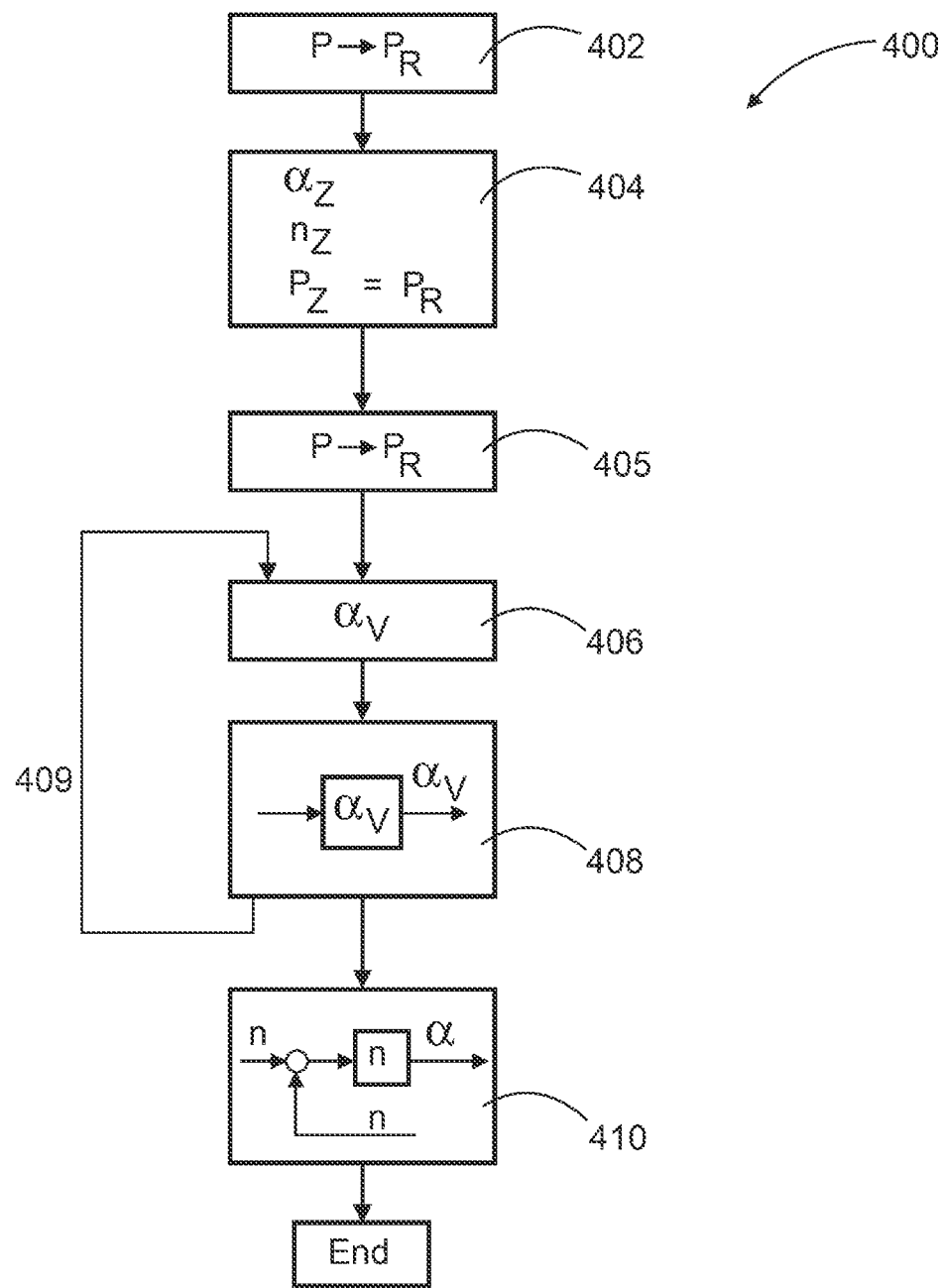
FIG. 4 shows a flowchart when a reduced power is specified as a curtailment request.

FIG. 4 shows a flowchart 400 in which a power limit is specified as a curtailment request. This is symbolized in the starting step 402 in that a reduced power $P_R$ is specified for the power P.

The method then passes to target determination step 404, in which the target operating point is defined and the values for the target blade angle $\alpha_Z$, the target speed $n_Z$ and the target power $P_Z$ are determined for this purpose. If a speed reduction is specified as a curtailment request, the target installation power $P_Z$ thus corresponds to the reduced power $P_R$.

In this process, when a reduced power is specified as a curtailment request, the installation power is reduced, in particular immediately or as quickly as possible, which is carried out in the power reduction step 405. The installation power is thus reduced to the reduced power, especially as far as or as quickly as this can be technically implemented. However, such a technical implementation can be carried out in a period of less than one second or at least a few seconds, such as a maximum of 5 seconds. In particular, this can be achieved by the inverters which feed into the electrical supply network immediately reducing their power to the specified power. However, if the curtailment request allows a slower power reduction, especially in a range of a maximum of 5 seconds or a maximum of 3 seconds, the power can be reduced correspondingly more slowly, for example via corresponding linear curtailment, that is to say via a time ramp function.

Such a curtailment request in which power is to be reduced can often be a specification from a network operator and in this case requires a correspondingly rapid action. In this case, the generator may not be able to reduce its power as quickly as the power fed into the grid is reduced. The resulting power surplus in the short term can be consumed in what are known as chopper resistors. It may also or alternatively be the case that the power generated by the generator is reduced more quickly than the aerodynamic power, which can lead to an acceleration of the rotor.

In any case, an attempt should be made to adjust the blade angle to the target blade angle as quickly as possible and, for this purpose, at least the feedforward control blade angle $\alpha_V$ is determined in the feedforward control determination step 406. The determination can be carried out as has been described in the feedforward control determination step 306 of FIG. 3, wherein the installation power has the value of the reduced power from the outset or has been carried out according to the implemented curtailment, for example using the time ramp function described.

In accordance with the flowchart 400 of FIG. 4, the sequence continues in the feedforward control step 408. In the feedforward control step 408, the feedforward control blade angle or its profile or a feedforward control adjustment rate is thus given directly to the blade angle control in order to be implemented there.

As explained in FIG. 3, the feedforward control determination step 406 and the feedforward control step 408 can also be repeated continuously in order to redetermine or update the feedforward control angle constantly, that is to say continuously or in short-term steps, and then also apply what is indicated by a corresponding repeat loop 409.

Here, too, it is proposed that, when the target operating point is reached or shortly before, the sequence or procedure changes from feedforward control step 408 to the closed-loop speed control step 410. In other words, the closed-loop speed control can replace the feedforward control process once the target operating point has been reached or almost reached. The procedure for changing from the first operating point to the target operating point is now complete and the closed-loop speed control can continue to operate the wind power installation at this new target operating point, as is also the case for the sequence of FIG. 3.

Figure 5:
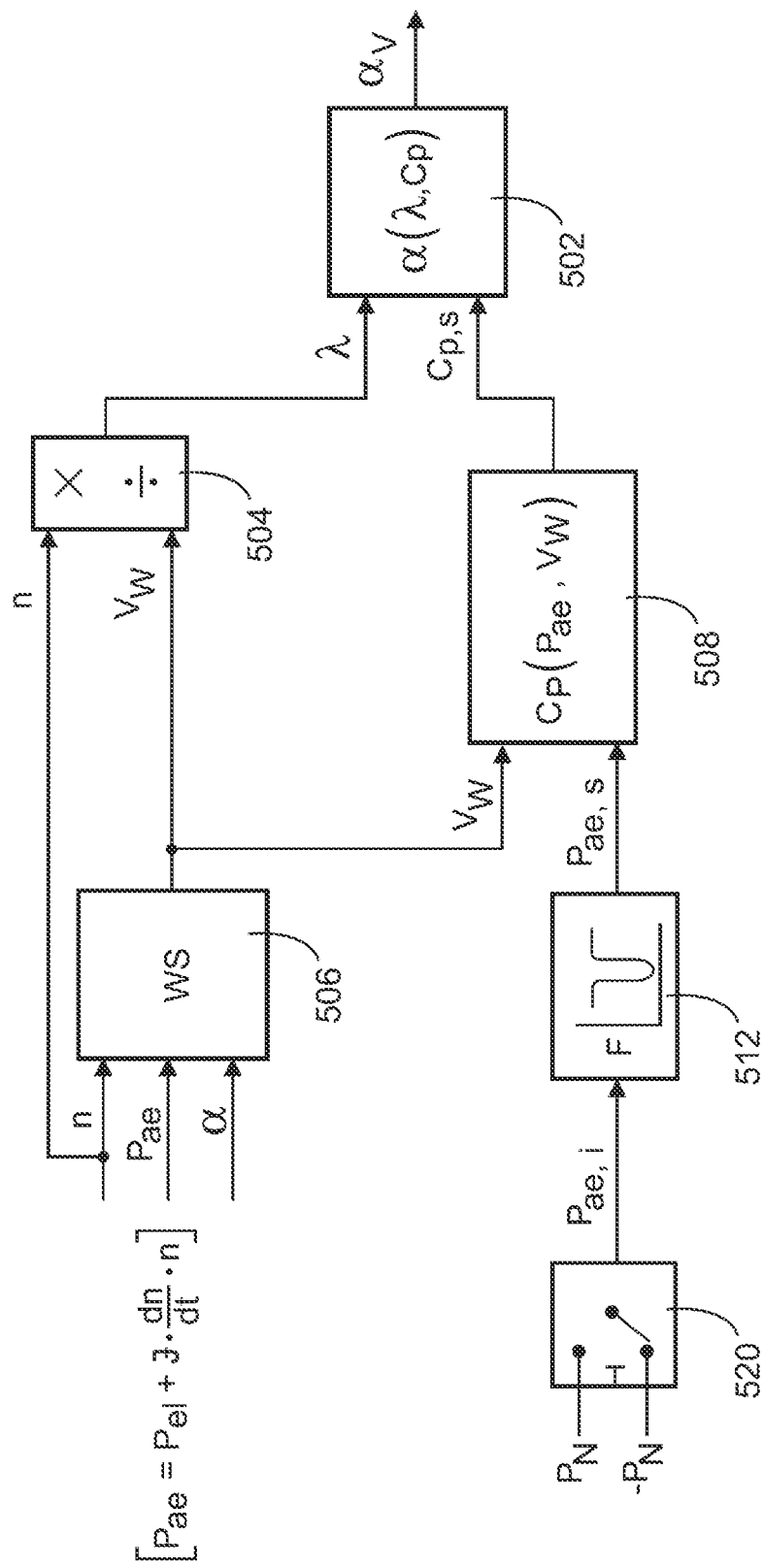
FIG. 5 shows a structure for calculating the feedforward control blade angle.

FIG. 5 shows a structure 500 for determining the feedforward control blade angle $\alpha_V$ according to one embodiment. The feedforward control blade angle $\alpha_V$ can in this case be determined in the characteristic map block 502 from the current tip-speed ratio $\lambda$ and a specified setpoint value for the power coefficient $C_{P,S}$. For this purpose, it is possible to store a characteristic map which indicates for the rotor used a relationship between the tip-speed ratio 2, the power coefficient $C_P$ and the blade angle $\alpha$.

The tip-speed ratio $\lambda$ results from the current rotor speed n, which is divided in the quotient block 504 by the current wind speed $V_w$. The speed is known from the installation control and the wind speed could be measured. Here, however, it is proposed to estimate the wind speed $V_w$, which is indicated by the estimation block 506. This allows the wind speed to be recorded with high accuracy and low noise.

The wind is estimated based on the rotor speed n recorded, the current aerodynamic power $P_{ae}$, that is to say the power currently drawn from the wind, and the currently set blade angle $\alpha$, which is known from the installation control, which controls the wind power installation as a whole.

The aerodynamic power $P_{ae}$ can be calculated from the currently generated electrical power $P_{el}$ and the mass moment of inertia J of the rotor, taking into account the rotor speed n and its change, according to the formula:

$$P_{ae} = P_{el} + J * n * dn/dt.$$

The wind estimator 506 can determine the wind speed from these three variables via a condition observer or from empirical values, which can be stored in a table.

The setpoint value of the power coefficient $C_{P,S}$, that is to say the desired and thus specified power coefficient, is determined from the current wind speed $V_w$ and a predetermined aerodynamic power $P_{ae,s}$. This is symbolized by the $C_P$ block 508. In the $C_P$ block, a quotient of the aerodynamic power $P_{ae}$ and a wind power $P_w$ assigned to the wind speed $V_w$ can be calculated. The present wind power $P_w$ in the rotor surface A of the rotor can be calculated from the wind speed and the air density p. This can be converted into a calculation of the power coefficient $C_P$ to be specified and leads to the formula:

$$C_P = P_{ae} * 2 / (A * \rho * (V_w)^3)$$

It is proposed that the aerodynamic power $P_{ae}$ be chosen in such a way that only realistic $C_P$ values can be obtained. However, the wind power installation is usually at operating points where unrealistic $C_P$ values cannot be expected. Finally, the aerodynamic power is to be reduced from the current operating point, such that too high a $C_P$ value cannot be expected.

If a power specification, that is to say power reduction, is specified as a curtailment request, the setpoint value of the aerodynamic power $P_{ae,s}$ can be set to the value of the power specification, that is to say the installation power to be curtailed, which can correspond to the target installation power. It is also possible to initially specify a lower aerodynamic power, for example with a value of zero.

However, if the wind power installation is to be braked very quickly, that is to say if the curtailment request is a speed specification, that is to say a speed reduction, especially in order to ensure bird or bat protection, a very high aerodynamic power can be specified in terms of the magnitude, that is to say a very high aerodynamic braking power.

However, in order not to overload the wind power installation, it is proposed to set the aerodynamic power $P_{ae,s}$ to the negative rated power $P_N$ of the wind power installation.

This should be illustrated by the application block 510. The application block 510 thus switches from a previous value, which may have been at maximum at $+P_N$, to $-P_N$ and outputs this as an ideal braking variable; in the embodiment shown it is thus as an ideal aerodynamic power $P_{ae,i}$. This ideal value is therefore a jump value, which can, however, lead to the excitation of the first tower oscillation, such that it is proposed to first guide it via the filter function 512. The filter function 512 is designed as a band-stop filter and filters out a frequency component that could excite a first natural tower frequency. The result is the filtered setpoint value for the aerodynamic power $P_{ae,s}$.

In such an application for protecting birds, which may also be stopping of the rotor in order to protect birds, a blade angle which aerodynamically brakes the wind power installation with negative nominal power is thus required. The first natural tower frequency is filtered out of said volatile signal to avoid tower excitation.

Figure 6:
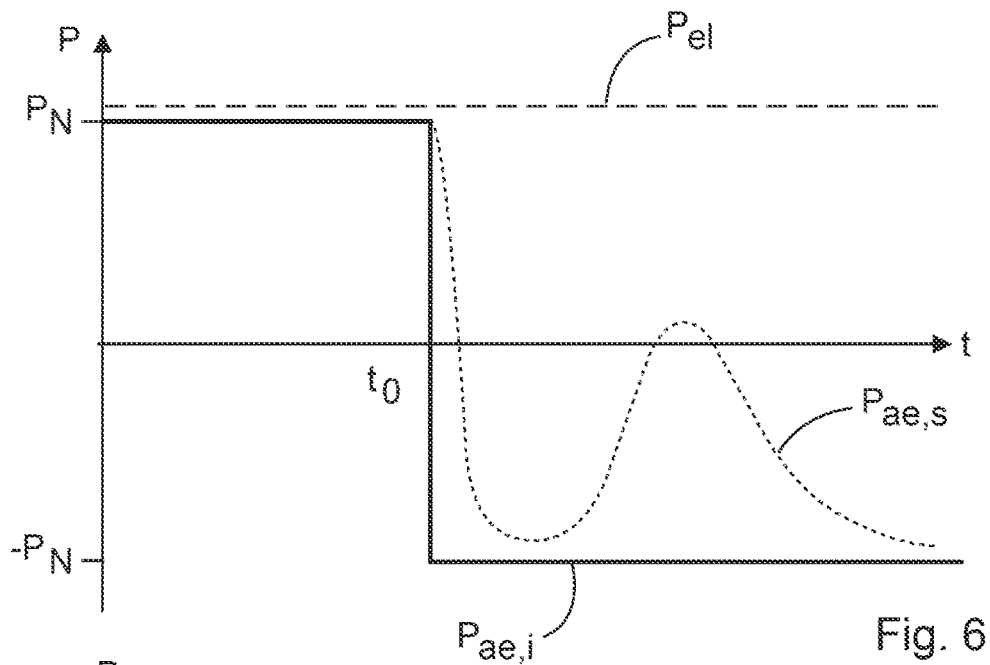
FIG. 6 shows a graph with a filtered jump size.

The effect of the specification of the ideal aerodynamic power by the application block 510, or generally an ideal braking variable, and of filtering with the filter function 512 is illustrated in FIG. 6.

FIG. 6 here shows a time graph in which the electrical power $P_{el}$, the aerodynamic target power $P_{ae,s}$ and the ideal aerodynamic power $P_{ae;i}$ are shown. The curtailment request is made at the time $t_0$. Until then, the electrical power $P_{el}$ and the aerodynamic power $P_{ae}$ are balanced. The slight differences in the profiles are only due to graphics.

At the time to, the ideal aerodynamic power $P_{ae,i}$ which changes from $P_N$ to $-P_N$ is then specified in a sporadic fashion. However, this negative jump is modified by filtering, so that the changed profile of the aerodynamic power to be specified results in $P_{ae}$, but the profile of which is rather understood symbolically. However, after some time, it should asymptotically approach the final value of the ideal functional profile. The aerodynamic power $P_{ae}$ is therefore not attenuated, only its profile is initially changed to avoid excitation of a tower oscillation.

Figure 7:
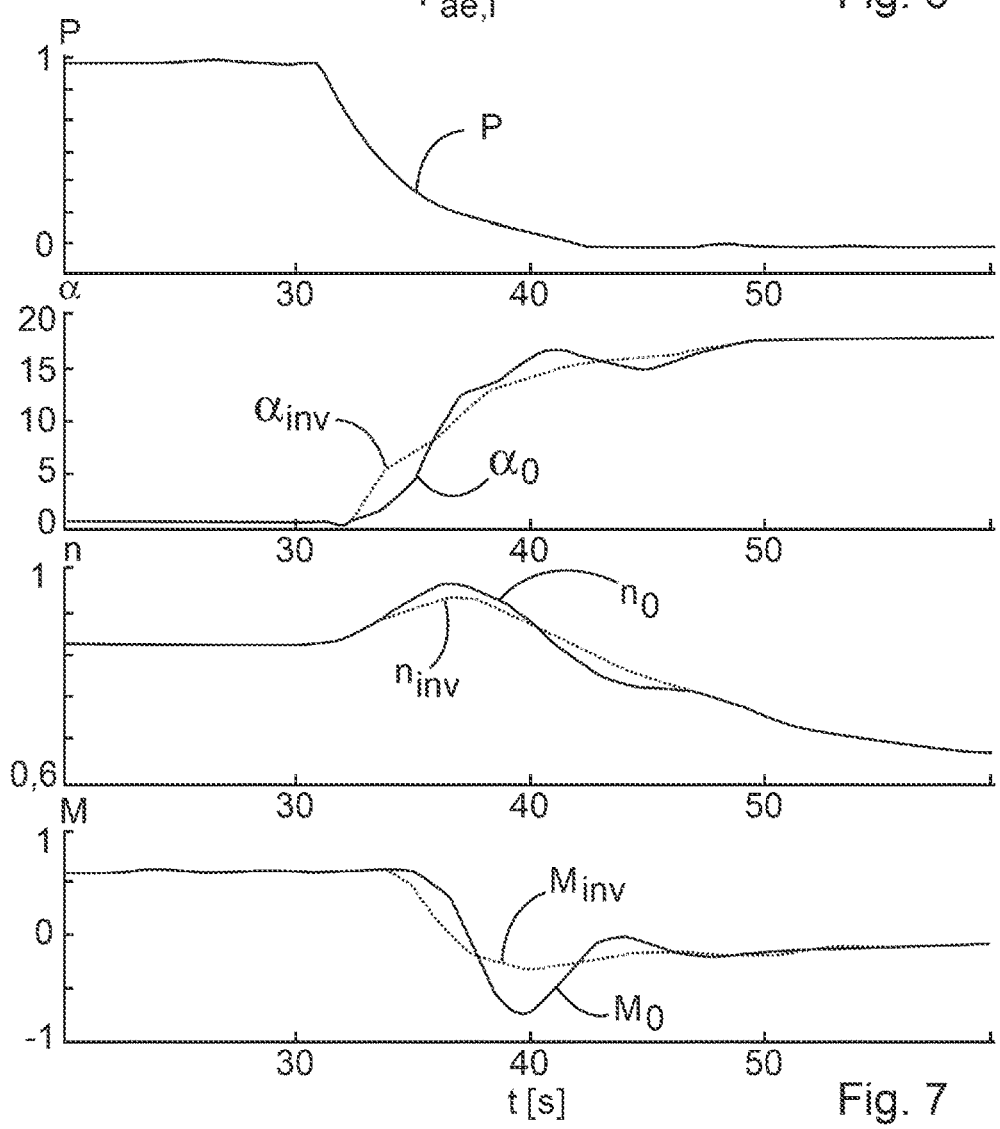
FIG. 7 shows simulation results of an applied method.

FIG. 7 shows the simulation of a curtailment process near nominal wind. The index "0" represents the reaction of an installation that uses only a classical closed-loop feedback control, and the index "inv" represents the reaction of an installation that reacts to the curtailment request by means of the feedforward control process described.

- The top subdiagram shows the profile of the power feed P, normalized to rated power. It is the same for both cases.
- The second subdiagram shows the blade angle profile, which can also be called the pitch angle profile. The profile $\alpha_{inv}$ shows a much earlier reaction than the process $\alpha_0$, which underlines the advantages of feedforward control.
- The third subdiagram shows the rotor speed profile normalized to a rated speed resulting from the power loss and pitch angle profile. It becomes clear that the speed increase is reduced by the earlier pitching at $n_{inv}$ compared to the profile $n_0$.
- The fourth subdiagram shows the tower foot load normalized to a maximum torque as torque $M_0$ or $M_{inv}$. It becomes clear that no significant overshoot occurs due to the early pitching.

Further aspects, considerations and effects of the invention are described below.

It has been recognized that applications involving faster speed or power reductions, especially aerodynamic power reduction with minimal mechanical loading, are diverse.

For example, detection systems for bird protection can be used to stop or reduce the speed in time in order to help protect species. However, this approach reduces the yield when bird contact is detected, or can even lead to unacceptable mechanical loading on the wind power installation if the stops are too numerous, or too strong or fast.

Another example is the rapid or even sudden reduction of the maximum electrical power, for example by a network operator. While the electrical system can reduce the infeed power quickly, usually in a time of less than one second, the reduction of the aerodynamic power takes place more slowly, by the movement of the blades. If this process is too slow, overspeed may occur, which can result in a high mechanical load on the wind power installation. On the other hand, too fast a movement of the blades also has its dangers. It is well known that this can reverse the rotor thrust and cause the nacelle to swing inadmissibly far forward. This also leads to an unacceptable mechanical load and is further amplified by the rapid power reduction.

A common feature of all applications is that the aerodynamic power absorbed by the rotor blades is reduced as quickly as possible, while the load on the wind power installation is intended to be as low as possible. These are both operational and extreme loads.

The reason why the aerodynamic power should be reduced depends on the application. Bird protection, which can also be more generally referred to as species protection, is about controlling the speed below a threshold value that does not pose a risk to birds or bats. In this case, the generator can also be used by simultaneously increasing the generator torque or the generator power as far as possible to reduce the aerodynamic power.

In the case of maximum power limitations, the primary aim is to match the aerodynamic power to the remaining infeed power of the generator as quickly as possible.

It is therefore particularly important to reduce the rotor speed of a wind power installation in a load-saving manner, where emergency stop situations are not implemented.

Some embodiments improve, among other things, the speed reduction time for bird protection occurrences.

Some embodiments avoid increased loads, which can occur particularly due to overspeeds or delayed or uncoordinated closed-loop control procedures, with maximum power reductions.

Until now, the installation has been stopped slowly during bird protection occurrences. Although this is load-saving, it takes more time, and therefore requires bird recognition in a larger radius around the installation. It also leads to an early curtailment of the wind power installation.

Overspeeds and tower loads have so far been accepted in the case of curtailments, on the basis of the expectation that these occurrences are neither relevant to extreme loads nor significantly relevant to operating loads. An improvement to this is now being proposed.

In particular, a solution that achieves the fastest possible rotor speed reduction in which no or no significant higher tower foot loads occur than in the case of a slower rotor speed reduction is proposed.

Irrespective of the application, implementation of a fast, but load-saving speed or power reduction as described herein is executed very similarly. The aim is to bring the blade angle to the new desired equilibrium state as quickly as possible, especially to the target blade angle, but not beyond it if possible. A closed control loop always runs the risk of overshooting if the setting is too strong. If the setting is too weak, the system is too slow.

Therefore, as described herein, feedforward control takes place, in which a blade angle is specified and controlled, which is precalculated. This angle, which forms the target blade angle, is calculated using a mathematical model of the wind power installation so that the wind power installation, which can be referred to as installation in a simplified and synonymous way, will absorb the aerodynamic target power after reaching this angle. Ideally, as a target blade angle, it can be approached at maximum speed; it can be precalculated as an ideal blade angle. Once this angle is reached, the movement is stopped, or only the closed control loop remains active or the installation control then uses the closed control loop again, namely the closed-loop speed control.

In accordance with one aspect, it is proposed that parameters of the closed-loop control loop, that is to say the closed-loop speed control, should also be adapted. In particular, it is proposed to increase a controller gain of the closed-loop speed control while changing the blade angle to the target blade angle. This allows the target blade angle to be actuated more quickly if the closed-loop speed control is activated in the meantime.

Since feedforward control processes are always based on assumptions about the controlled system, there may be inaccuracies.

Therefore, according to one aspect, it is proposed to stop the feedforward control process even if the desired state is approximately reached, especially based on the difference between the target blade angle or ideal blade angle and the current blade angle. This can be done like this, but does not have to be. The closed control loop can therefore always remain active without being applied. This is particularly useful if the feedforward control process is actually deactivated. In order to continue to achieve a fast closed-loop control response in these situations, it is proposed to adjust the closed control loop, which is otherwise designed for normal operation.

Since the feedforward control process is not continuously active, but only in the above-mentioned applications, a proposed procedure consists of the following steps:
1. Recognition of the application, namely the curtailment request, in particular limited maximum power or bird protection.
2. Recognition of the need for a feedforward control process, namely checking whether the new operating point, that is to say the target operating point, is so far away from the current state, that is to say the current or first operating point, that a feedforward control intervention appears worthwhile, or whether the closed-loop speed control is sufficient.
3. Activation of the feedforward control process, that is to say targeted movement of a blade angle, namely the target blade angle, at which the desired aerodynamic power is absorbed or discharged.
4. If necessary, adaptation of the parameters of the closed control loop, especially the closed-loop speed control.
5. Deactivation of the feedforward control process as soon as the new operating point, in particular the associated new speed, is approximately reached.
6. If necessary, undoing the adjustment of the control parameters of the closed-loop speed control.

Depending on the application, additional steps or aspects may be added.

For the protection of birds, which is representative of species protection here, in particular including bat protection, the following should be noted:

In bird protection, no aerodynamic power can be absorbed at all in the target state in which the rotor is to rotate slowly, or is almost stationary. Some embodiments, however, focus on the transient speed reduction process for bird protection, during which aerodynamic power is emitted or "negative power" is absorbed. The aim here is to quickly reduce the aerodynamic power in order to achieve a low-risk rotor speed. In practical terms, an aerodynamic power is chosen in such a way that the rotor is sufficiently decelerated within a desired time without mechanically overloading the wind power installation. For example, the aerodynamic power may correspond to the negative value of the maximum positive aerodynamic power in normal operation. Specifically, an aerodynamic deceleration power of for example −4.2 MW can be parameterized for an exemplary installation with a rated power of +4.2 MW, provided that the rotor blade can absorb the same loads in the positive and negative thrust directions.

Due to the relationship $do/dt=J*\Delta M$, the approximate deceleration time is also known, provided that $\Delta M$ also includes the generator torque. As an alternative, it is proposed that the desired deceleration time is used as a specification for the calculation of the aerodynamic power.

In order to perform feedforward control of an aerodynamic power at any time and, together with the generator power, a deceleration power, the actual speed or the actual tip-speed ratio is used for the calculation of the ideal blade angle.

Since the change in aerodynamic power leads to a change in speed, it is proposed to define a corresponding deactivation criterion. For example, the target speed has been reached approximately (see point 5 above, "Deactivation of the feedforward control process"). However, it is also possible to stop the feedforward control beforehand. A feedforward control process could overshoot the target due to model uncertainties. This could be harmless with regard to speed or bird protection. However, the tower could be subjected to too much load, and on the one hand in its extreme load, especially if the thrust becomes too negative, and on the other hand in its operating load, especially if aerodynamic damping has become too small due to large blade angles. Therefore, in such cases, it is proposed to stop the feedforward control process beforehand and to control the remaining control error with the closed control loop, where the dynamics of the closed control loop have been adapted to the situation (see point 4, "If necessary, adaptation of the parameters").

For adjusting a target rotor speed in non-critical-load conditions (see point 4 above, "If necessary, adjustment of parameters") the following should be noted: Especially for the application of bird protection, rapid adjustment of a target speed is required even in situations where the thrust has already been reduced in a load-saving manner. This is typically the case from a blade angle of 20°. The closed control loop parameters can be further adapted for the period between leaving the range of load-critical operating points and reaching the desired target speed. For this portion of the rotor speed reduction, significantly higher return reinforcements are possible than for load-relevant operating points, for example a quadrupling.

To reduce the maximum power as a curtailment request, the following should be noted:

In the feedforward control process of a maximum power, the aerodynamic power can be set directly in such a way that it corresponds to the new desired operating point, that is to say the new maximum infeed power specified by the curtailment request plus power losses to be compensated by the generator, which have been neglected in the above considerations and descriptions. In the calculation of the ideal blade angle, there is therefore a deviation from the bird protection application. While the actual speed was used there, the target speed, that is to say the new setpoint speed of the new operating point, should be used here when a power reduction is specified. In this way, the installation controls directly to the new operating point.

A feedforward control process of a transient for speed reduction is proposed according to one embodiment.

European patent application no. 22217229.8, filed Dec. 29, 2022, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for control of a wind power installation which is connected to an electrical supply network and which has a rotor with rotor blades which are adjustable in terms of their blade angle, is able to be operated at a variable speed and is prepared for generating an installation power from wind, wherein:
   a blade angle control is provided for adjusting the blade angles;
   a closed-loop speed control is provided for closed-loop control of the speed;
   a closed-loop power control is provided for limiting the installation power; and the wind power installation is able to be operated at an operating point which can be specified, wherein the operating point is characterized at least by the speed and the installation power;

comprising:
operating the wind power installation at a first operating point with a first blade angle;
checking for a curtailment request, where a reduction in the speed and/or installation power is requested; and
if there is a curtailment request:
determining a new operating point as the target operating point depending on the curtailment request, wherein the target operating point is characterized by a target speed and a target installation power; and
determining a setpoint blade angle as the target blade angle for the target operating point,
wherein in order to change the blade angle to the target blade angle, a feedforward control blade angle, or a feedforward adjustment rate describing an adjustment rate of the blade angle, is specified via a feedforward control blade angle control, and
wherein the feedforward control blade angle control gives the feedforward control blade angle or the feedforward control adjustment rate directly to the blade angle control for implementation.

2. The method as claimed in claim 1, wherein:
the feedforward control process specifies the feedforward control blade angle or the feedforward control adjustment rate;
independently of a speed deviation as a deviation of a recorded speed from a specified speed; and/or
independently of the recorded speed and independently of the recorded installation power; and/or
independently of the closed-loop speed control and independently of the closed-loop power control process, and:
the change in the blade angle from the first blade angle to the target blade angle is specified completely or predominantly by the feedforward control process.

3. The method as claimed in claim 1, wherein:
the target blade angle is defined as an ideal blade angle which, under steady-state conditions at the target operating point, leads to the target speed and target power; and/or
the feedforward control process specifies a fixed blade angle or a fixedly specified temporal blade angle profile as the feedforward control blade angle or a fixed adjustment rate as the feedforward adjustment rate; and/or
the feedforward control blade angle or the feedforward control adjustment rate is determined using a model which reproduces the behavior of the wind power installation; and/or
a target tip-speed ratio is provided for the target operating point as the tip-speed ratio characterizing the target operating point; and
the target blade angle is determined in such a way that the target tip-speed ratio is set at the target operating point under steady-state conditions.

4. The method as claimed in claim 1, wherein:
the curtailment request is selected from the list comprising:
a speed request as a request for a speed reduction, for the protection of an approaching animal, wherein the speed request specifies the level of a specific target speed; and a power request as a request for a reduction of the installation power for supporting the electrical supply network, wherein the power request specifies the level of a specific target power; and/or,
in the case of a power request as the curtailment request:
a maximum power is specified for the installation power;
the current installation power, if it is greater than the maximum power, is reduced to the maximum power; and
in order to change the speed to the target speed, the blade angle is adjusted to the target blade angle by means of the blade angle feedforward control process; and/or
in the case of a speed request as the curtailment request:
the target speed is specified;
the installation power is set according to the specified target speed; and
in order to change the speed to the target speed, the blade angle is adjusted to the target blade angle by means of the blade angle feedforward control process, wherein,
in order to decelerate the rotor, the installation power or a generator torque are specified in order to achieve the greatest possible deceleration of the rotor in combination with an aerodynamic power which has been subjected to feedforward control.

5. The method as claimed in claim 1, wherein:
the blade angle feedforward control process specifies the blade angle or the adjustment rate as a manipulated variable, and:
the closed-loop speed control specifies the blade angle or the adjustment rate of the blade angle as a manipulated variable depending on a speed deviation; and
the closed-loop speed control, at least temporarily, is subordinate to the blade angle feedforward control process such that the manipulated variable specified by the closed-loop speed control is at least temporarily not transmitted to the blade angle control or only with a weighting of less than 50%, wherein:
of the closed-loop speed control and the blade angle feedforward control process, the one which outputs the larger blade angle to be set or the larger adjustment rate to be set as the manipulated variable is active; and/or
the closed-loop speed control is given a speed profile which is specified based on a model.

6. The method as claimed in claim 1, wherein:
an aerodynamic braking variable is specified in order to change the speed, wherein the aerodynamic braking variable is provided as a rotor acceleration or an aerodynamic power, wherein the aerodynamic power is a power generated by the rotor from the wind; and
the feedforward control blade angle is determined depending on the specified braking variable in order to achieve the specified braking variable.

7. The method as claimed in claim 6, wherein the blade angle which results in the specified aerodynamic braking variable is determined as the feedforward control blade angle depending on the speed, wind speed and specified aerodynamic braking variable.

8. The method as claimed in claim 1, wherein:
the specification of the feedforward control blade angle is repeated continuously, or at least in short-term steps of less than one second.

9. The method as claimed in claim 1, wherein:
an ideal braking variable is specified in order to specify an aerodynamic braking variable; and the ideal braking variable is filtered by means of a filter in order to obtain the aerodynamic braking variable, wherein:
in order to obtain the aerodynamic braking variable, the filter filters from the specified ideal braking variable at least one natural oscillation frequency of the wind power installation, which is a natural tower frequency; and
the filter is a band-stop filter and/or a notch filter.

10. The method as claimed in claim 1, wherein:
the blade angle is determined depending on speed, wind speed and specified aerodynamic power based on a model and/or based on predetermined relationships; and/or
the blade angle feedforward control process specifies the blade angle or the adjustment rate as a manipulated variable in order to perform feedforward control of the aerodynamic power and the closed-loop speed control, at least temporarily, is subordinate to the blade angle feedforward control process, wherein:
of the closed-loop speed control and the blade angle feedforward control process, the one which outputs the larger blade angle to be set or the larger adjustment rate to be set is active.

11. The method as claimed in claim 1, wherein:
the closed-loop speed control outputs a setpoint blade angle or a setpoint adjustment rate as the difference between an actual speed and a setpoint speed depending on a closed-loop speed control deviation, and
the closed-loop speed control is changed or suspended, while the blade angle feedforward control process directly specifies the blade angle to be set or the adjustment rate to be set.

12. The method as claimed in claim 1, wherein:
a time profile of a setpoint speed is specified in order to control the target operating point of the closed-loop speed control; and/or
a time profile of a setpoint power is specified in order to control the target operating point of the closed-loop power control; and/or
while the blade angle feedforward control process directly specifies the blade angle to be set or the adjustment rate to be set;
the closed-loop speed control is modified in terms of its parameterization.

13. The method as claimed in claim 1, wherein:
a change in blade angle from the first blade angle to the target blade angle can be described as a relative blade angle change of from 0% to 100%, where 0% corresponds to the first blade angle and 100% corresponds to the target blade angle; and
the adjustment of the blade angle by means of the blade angle feedforward control process from the first blade angle to the target blade angle is interrupted before the target blade angle is reached and/or is taken over by the closed-loop speed control, wherein:
the blade angle is adjusted by means of the blade angle feedforward control process for at least 5% to 90%; and/or
the closed-loop speed control is changed or deactivated during this time.

14. The method as claimed in claim 1, wherein:
in order to control the target operating point, an aerodynamic braking power with which the rotor is to be braked by the wind is determined; and
the blade angle is determined by the blade angle feedforward control process in such a way that the rotor outputs the aerodynamic braking power to the wind, wherein:
the aerodynamic braking power is selected in a range of from 10% to 120% of a rated power of the wind power installation.

15. The method as claimed in claim 1, wherein:
in order to determine the target operating point, a wind speed is estimated based on the speed, the power and the first blade angle; and/or
the speed and/or the power at the target operating point is greater than zero; and/or
a desired reduction time within which the target operating point is to be reached is specified; and
the specification of the temporal blade angle profile is determined depending on the desired reduction time by using a model; and/or
after the blade angle adjustment has been completed using the blade angle feedforward control process;
the closed-loop speed control controls or limits the speed to a setpoint speed.

16. The method as claimed in claim 1, wherein:
if there is a curtailment request;
there is a check to determine whether the target operating point is at a sufficient distance from the first operating point; and
the blade angle is adjusted by means of the blade angle feedforward control process only if the distance of the target operating point is sufficient, wherein:
a sufficient distance is present if the distance is above a predeterminable comparison distance, wherein:
a difference between the current speed and the target speed is considered as the distance and is considered sufficient if it is greater than a minimum speed difference that can be specified; and/or
a difference between the current installation power and the target power is considered as the distance and is considered sufficient if it is greater than a minimum power difference that can be specified; and/or
a difference between the first blade angle and the target blade angle is considered as the distance and is considered sufficient if it is greater than a minimum angle difference that can be specified.

17. The method as claimed in claim 1, wherein:
an approach of an animal leads to a speed request as the curtailment request; and
the target speed is determined on the basis of one criterion, a plurality or all of the criteria from the list comprising:
a position of the flying animal;
a species of the flying animal;
a speed of movement of the flying animal; and
a direction of movement of the flying animal; and/or
a behavior of the flying animal is observed further and a new target speed is specified depending on the observed behavior of the flying animal.

18. The method as claimed in claim 1, wherein in order to specify the feedforward control blade angle, a power coefficient to be set is determined and the feedforward control blade angle is determined depending on the power coefficient in order to achieve the power coefficient.

19. The wind power installation which is connected to the electrical supply network and which has the rotor with rotor blades which are adjustable in terms of their blade angle, is able to be operated at the variable speed and is prepared for generating an installation power from wind, wherein:

the blade angle control is provided for adjusting the blade angles;
a closed-loop speed control is provided for controlling or limiting the speed;
the closed-loop power control is provided for limiting the installation power;
the wind power installation is able to be operated at a predeterminable operating point, wherein the operating point is characterized at least by the speed and the installation power; and
the wind power installation is prepared to carry out a method as claimed in claim 1, wherein:
   the wind power installation has an installation control system in which such a method is implemented.

\* \* \* \* \*